United States Patent [19]

Fino et al.

[11] Patent Number: 4,726,020

[45] Date of Patent: Feb. 16, 1988

[54] MULTIPLEX INFORMATION TRANSMISSION SYSTEM

[75] Inventors: Bernard Fino, Marly-le-Roi; Yves H. M. Le Goffic, Lannion, both of France; Alain B. R. Forestier, Dorval, Canada

[73] Assignee: Telecommunications radioelectriques et telephoniques T.R.T., Paris, France

[21] Appl. No.: 861,204

[22] Filed: May 8, 1986

[30] Foreign Application Priority Data

May 3, 1985 [FR] France .................................. 85 06755

[51] Int. Cl.$^4$ ........................ H04J 3/00; H04Q 11/12
[52] U.S. Cl. .......................................... 370/99; 455/127
[58] Field of Search ......................... 455/68, 69, 127; 370/77, 104

[56] References Cited

U.S. PATENT DOCUMENTS 3,176,229   3/1965   Pierce ................................... 455/127
4,007,455   2/1977   Mabuchi et al. ..................... 455/127

Primary Examiner—Douglas W. Olms
Assistant Examiner—Frank M. Scutch, III
Attorney, Agent, or Firm—Thomas A. Briody; Jack Oisher; William J. Streeter

[57] ABSTRACT

A system for transmitting information between at least two stations the information originating from free or engaged channels in a multiplex frame, each station comprising at least one transmitting circuit and one receiving circuit powered from a power supply, and means for detecting the free and engaged channels to provide a procedure for establishing a multiplex formed by an elementary frame in which the engaged channels are grouped side-by-side in the elementary frame and means for reducing the power consumption of the transmitting and receiving circuits.

13 Claims, 16 Drawing Figures

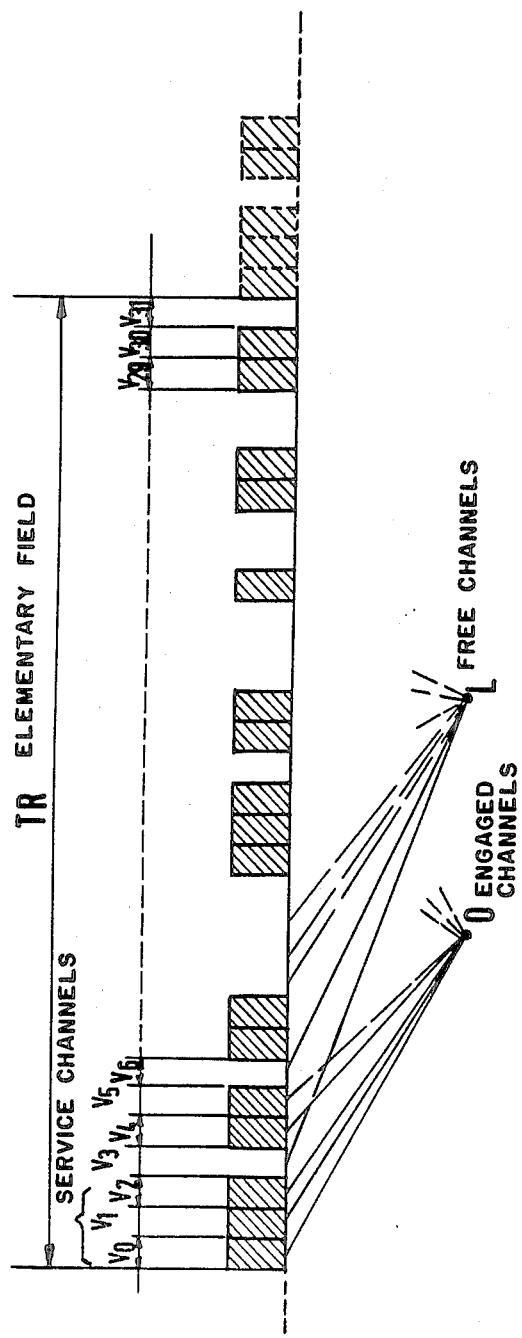

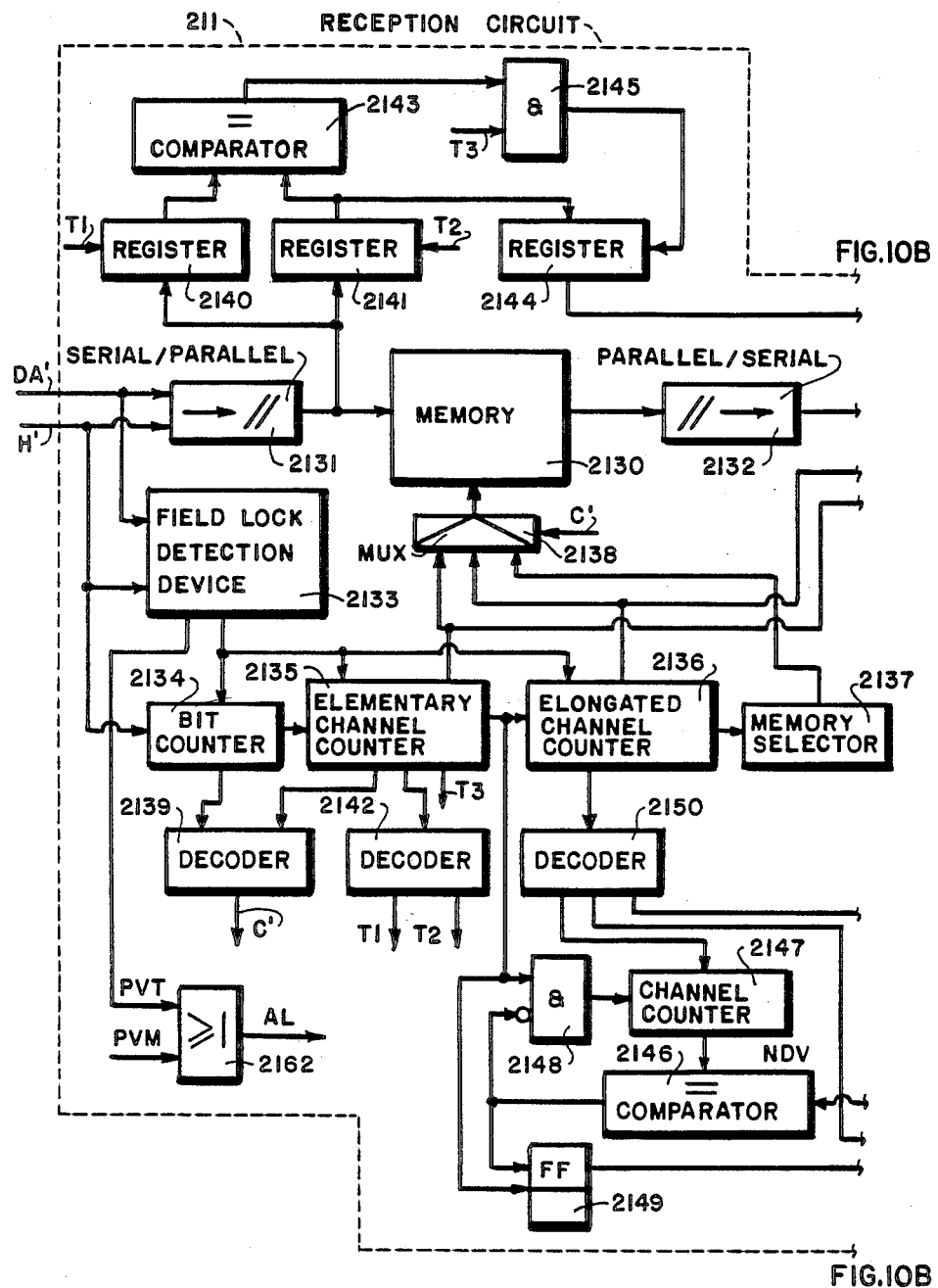
FIG.IOA 4,726,020

MULTIPLEX INFORMATION TRANSMISSION SYSTEM

BACKGROUND OF THE INVENTION

The present invention relates to a system for the transmission of information between at least two stations for transmitting information from free or engaged channels, each station having at least one radio transmitting and one reception circuit, powered from a power supply and means for detecting the free or engaged channels.

Such a system is known and described in the publication "COMMUTATION ET TRANSMISSION", No. 3, September, 1981, in an article entitled "Système de téléphone rurale IRT 1500" ("IRT 1500 rural telephone system"). The article describes a numeric rural telephone system for low-density traffic in which a central and distant stations are linked by radio. In the IRT 1500 system, the distant stations are usually in remote areas, often without a mains electricity supply. They therefore often have to be solar-powered. It is therefore essential to keep the power consumption of the various stations low, and one way of doing so is to use CMOS technology in the design of the equipment.

It must nevertheless be admitted that the equipment in the stations like transmission and reception circuits are continuously powered and consume energy even when there is no information to transmit, at times of very low-density traffic, especially at night, for example.

The aim of the invention is to eliminate this drawback, and it proposes means of very substantially reducing power consumption.

Here, the information transmission system of the type described in the preamble is noteworthy in that it has means working together with the detection means to set up a process for creating a time multiplex consisting of an elementary field of duration T in which the information from engaged channels is grouped side-by-side in said elementary field and means for reducing the consumption of the transmission and reception circuits from the detection of free channels and to provide a normal power supply for the transmission and reception circuits from the detection of engaged channels.

The idea of the invention is based on the fact that, in order to make a substantial saving in the power of the various stations, the transmission and reception circuits are to operate only when there is useful information to transmit.

In addition, the multiplex field is so organised that the channels in continuous use, i.e. the "service" channels (rhythm, synchronisation, signalling, etc.) and the "engaged" channels allocated to the request are grouped, for instance, at the beginning of the multiplex field which means that, if traffic is low, there is a large number of unused contiguous channels at the end of the field. As soon as a channel becomes free, it is used as a matter of priority until a fresh allocation is requested. The signalling channels carry information showing which channels are in use and the number of the last channel used in the field. The transmission and reception circuits may thus be cut off from the last channel used. They must, however, be re-activated before the start of the new field to take account of their response time.

If, nevertheless, the response time of the transmission and reception circuits is smaller than the duration T of a multiplex field, it is still of the same order of magnitude and the resultant power saving is fairly small. Therefore, and in order to increase power savings very substantially, the influence of the response time of the transmission and reception circuits must be reduced.

BRIEF SUMMARY OF THE INVENTION

It is with this in view that the invention puts forward means for reducing the influence of the response time of the transmission and reception circuits. In another feature of the invention, the information transmission system in which the elementary multiplex fields carry information concerning service and data channels is noteworthy in that it also comprises means for grouping the elementary multiplex fields n by n, with the service and engaged data channels grouped n by n and side-by-side in the resultant new field.

In this new multiplex organisation, therefore, the new field comprises several (n) elementary fields and the channels of the same rank are grouped side-by-side, n by n. The channels used are always assembled side-by-side, at the start of the field, for example. The response time of the transmission and reception circuits, which remains constant, is thus made virtually negligible in relation to the duration nT of the new field and the number of free time intervals; the power saving can then be very considerable.

A proper understanding of how the invention can be implemented is given by the description below with reference to the attached drawings, shown by way of example.

BRIEF DESCRIPTION OF THE DRAWING

FIG. 2 is a multiplex with free and engaged channels.

FIGS. 9A, 9B, 10A and 10B put forward a display diagram for the re-conversion of the multiplex and controlling the reception circuit.

DETAILED DESCRIPTION OF THE PREFERRED EMBODIMENT

Figure 1A:
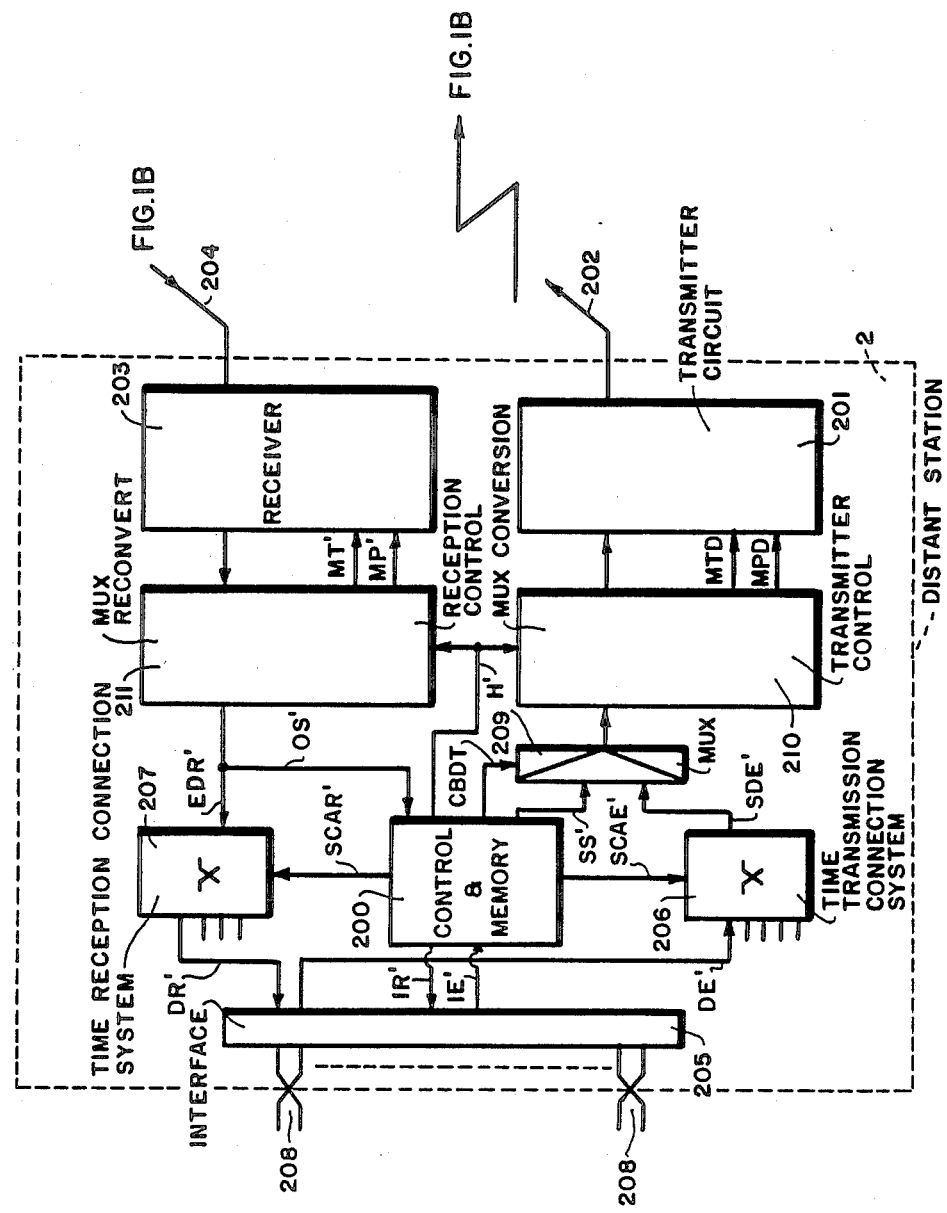
FIGS. 1A and 1B are a diagram of a transmission system of the invention.
Figure 1B:
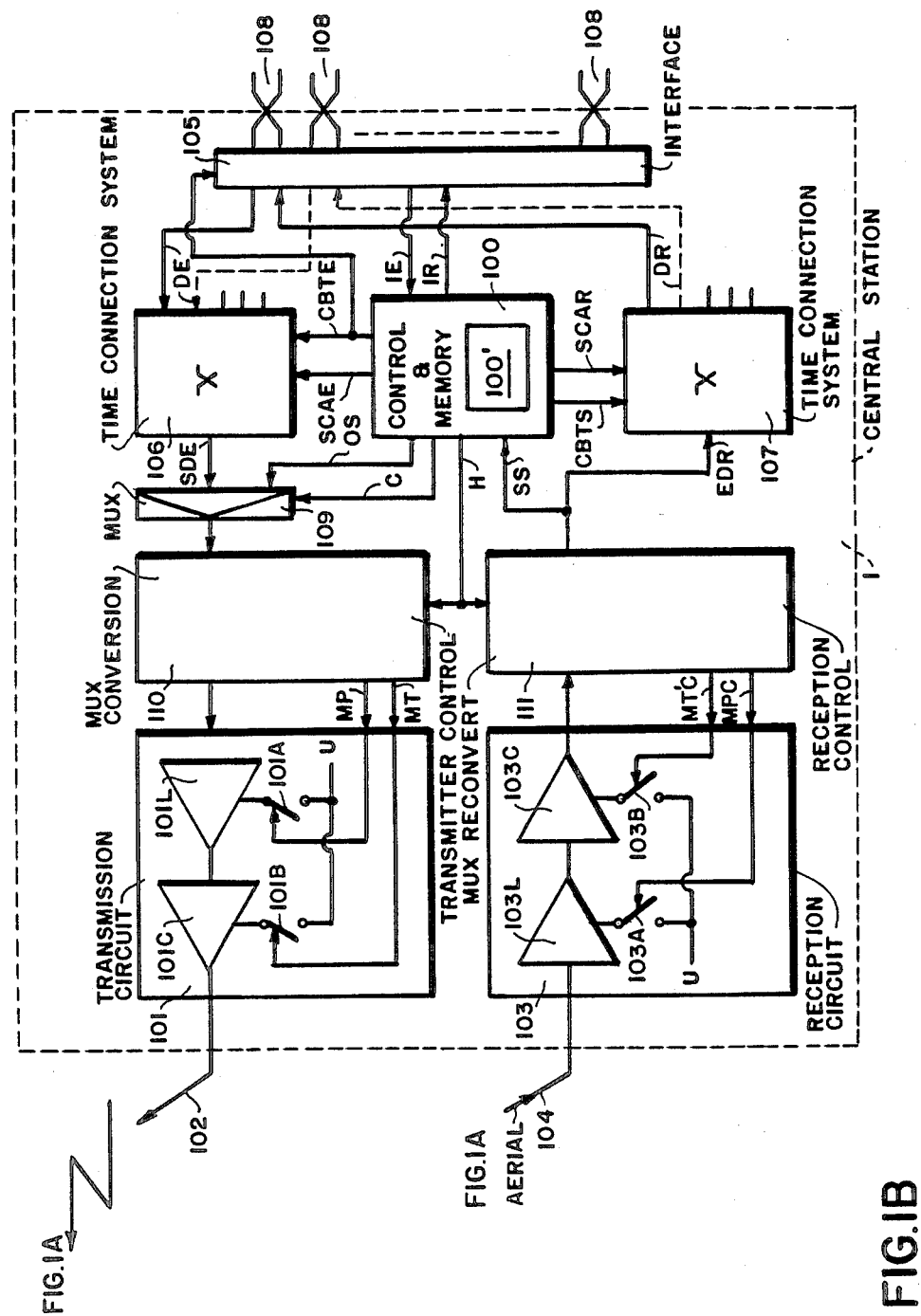

FIGS. 1A and 1B are a diagram of an information transmission system in which the invention is used. The essential purposes of such a system are to concentrate telephone traffic and transmit it in a fully transparent manner via a Hertzian channel between a central station 1 attached to a telephone exchange (not shown on the drawing) and at least one distant station 2 associated with a group of subscribers.

Central station 1 is monitored by a control and memory device 100 which manages and memorises the information to be transmitted by radio to distant station 2 via transmission circuit 101 and its aerial 102 and information received by reception circuit 103 and its aerial 104 from distant station 2. Transmission and reception circuits 101 and 103 are powered by a power supply U.

Transmission circuit 101 has units 101 L which, when the switch-on order is given, have considerable response times (of the order of 100 μs, e.g. a local oscillator, a synthesiser, etc.), and units 101 C with shorter response times (of the order of 20 μs for a modulator and much shorter for an amplifier). Likewise, reception circuit 103 has units 103 L with the same long response time on switch-on (e.g. a local oscillator, a synthesiser, etc.) and units 103 C with shorter response times (e.g. a demodulator, an amplifier, etc.).

An interface device 105, syn-chronous with control and memory device 100, CBTE signal, provides the link between control and memory device 100 and the telephone exchange for signallings relating to the various communication channels, signallings IE to be transmitted, signallings IR received. Interface device 105 also links the telephone exchange with a time transmission connection system 106 for the data DE to be transmitted and with a time reception connection system 107 for the received data DR. Interface device 105 is connected to the telephone exchange by telephone pairs 108. Control and memory device 100 monitors the operations of time transmission connection system 106 via SCAE address control signals and of time reception connection system 107 via SCAR address control and CBTS synchronisation signals.

Control and memory device 100 comprises means for detecting the free or engaged channels which will be described with reference to FIG. 4.

In this example, a 32-channel multiplex shown in FIG. 2 is selected. At the output of time transmission connection system 106 there is then a single SDE 32-channel link, multiplexed by a multiplexer 109 which also receives the command signals and signallings OS from the channels and a control signal C from control and memory device 100. These signals, thus multiplexed, are transmitted to transmission circuit 101. Receiver 103 transmits the signals received to time reception connection system 107 (EDR signals) and to the control and memory device (SS signals).

The structure of a distant station 2 is symmetrical with that of central station 1. Distant station 2 is also monitored by a control and memory device 200 synchronous with that of the central station and has a transmission circuit 201 and an aerial 202 and a reception circuit 203 and aerial 204. Transmission and reception circuits 201 and 203 have the same characteristics as the transmission and reception circuits 101 and 103 in central station 1 and are also powered from a power supply U (not shown on the figure). An interface device 205 provides the link between control and memory device 200 and the subscribers' sets with regard to the signallings concerning the various communication channels, with signallings to be transmitted IE' and received signallings IR'. The interface device is also linked to the subscribers' sets with a time transmission connection system 206 for the data DE' to be transmitted and a time reception connection system 207 for the received data DR'. Interface device 205 is connected to the subscribers' sets via telephone pairs 208. Control and memory device 200 monitors the operations of time transmission connection system 206 via address control signals SCAE' and of time reception connection system 207 via address control signals SCAR' Output SDE' of time transmission connection system 206 is connected to a multiplexer 209 which also receives command signals and signallings SS' from channels and a control signal CBDT from control and memory device 200. Once multiplexed, these signals are transmitted to transmitter circuit 201. Receiver 203 transmits the signals received to time reception connection system 207 (signals EDR') and to control and memory device 200 (signals OS').

According to the invention, the information transmission system between at least two stations for the transmission of information from free and engaged channels, where each station has at least one radio transmission and one radio reception circuit powered from a power supply and means for detecting the free or engaged channels is noteworthy in that it has means working with means of detection to provide a process for creating a time multiplex formed by an elementary field of duration T, in which the information from the engaged channels is grouped side-by-side in said elementary field and means for reducing the power consumption of the transmission and reception circuits from the detection of free channels and to provide a normal power supply for the transmission and reception circuits from the detection of the engaged channels.

In fact, control and memory device 100 works together with means 100' to set up a procedure for grouping the engaged channels side-by-side in the multiplex field. This procedure will be described with reference to figure 6.

According to one feature of the invention, the information transmission system in which the elementary multiplex fields carry information concerning the service and data channels is noteworthy in that it also comprises means for grouping the elementary multiplex fields n by n, while the service and engaged data channels are grouped n by n and side-by-side in the new field obtained.

It is therefore of advantage to insert, into central station 1, between multiplexer 109 and transmission circuit 101, a multiplex conversion and transmitter circuit control device 110; likewise between reception circuit 103 and the time reception connection system 107 and control and memory device 107, is also inserted a multiplex reconversion and reception circuit control device 111. The output of multiplexer 109 is connected to the input of device 110, which also receives a clock pulse H produced by control and memory device 100.

According to another feature of the invention, the information transmission system in which each central or distant station has at least one transmission and one reception circuit is noteworthy in that it comprises means for partly or totally cutting off and powering the transmission and reception crcuits. Additional power is thus saved. The switch-on and therefore the powering of a transmission or reception circuit is effected partly three channels before the end of the field for units 101 L and 103 L, which take longest to resume operation, whereas units 101 C and 103 C, which resume more quickly, are powered one channel or less before the end of the field, so that all the transmission or reception circuits are powered. Thus the transmission or reception circuit is once more ready to transmit information at the start of the new field.

From the input signals (multiplex, clock H), device 110 transmits a partial and total resumption signal MP and MT respectively with the intention of partly or fully powering transmitter circuit 101, and also converts the elementary multiplex of duration T into an elongated multiplex of duration nT. Signal MP is applied to a switch 101 A which, when signal MP is active, connects power supply U to units 101 L of transmission circuit 101. Signal MT is applied to a switch 101 B which, when signal MT is active, connects power supplu U to units 101 C. When signals MP and MT are active, the elongated multiplex at the input of the transmission circuit is then transmitted by radio to distant station 2.

Likewise, multiplex reconversion and reception circuit control device 111 which also receives clock pulse H produces partial starting signal MP'C applied to switch 103 A intended to power units 103 L via power supply U, and total starting signal MT'C applied to switch 103 B intended to power units 103 C via power supply unit U and reconverts the elongated multiplex of duration nT into an elementary multiplex of duration T.

A multiplex conversion and transmission circuit control device 210 identical to device 110 in central station 1 is also inserted into distant station 2 between multiplexer 209 and transmission circuit 201. Likewise, a multiplex reconversion and receiver control device 211 is also inserted between reception circuit 203 and time reception connection system 207 on the one hand and control and memory device 200 on the other. The output of multiplexer 209 is connected to the input of device 210, which also receives a clock pulse H' produced by control and memory device 200.

Device 210 produces a partial and total starting signal MPD and MTD respectively to power transmitter circuit 201 partly or fully and converts the elementary multiplex into an elongated multiplex. When signals MPD and MTD are active, the elongated multiplex is then transmitted by radio to central station 1 (with signals MPD and MTD produced in the same way as MP and MT).

Likewise, multiplex reconversion and reception circuit control device 211, which also receives clock pulse H', produces partial start signal MP' and total start signal MT' and reconverts the elongated multiplex into an elementary one, with signals MP' and MT' produced in completely the same way as signals MP'C and MT'C.

FIG. 2 shows a multiplex comprising engaged and free channels. In this multiplex supporting the description, a field TR consists of 32 channels V0, V1, V2, V3, V4, V5, V6, ... V29, V30, V31. Some channels are engaged and are given the reference 0, e.g. V0, V1, V2, V4, etc., while others are free and are given the reference L, e.g. V3, V6, etc. Such a channel configuration in the field may exist before the means of the invention are applied.

It would be best to give a brief description of a field, using the example of the aforementioned multiplex, for a better understanding of the invention, although this field structure shall by no means be limitative.

The elementary field, i.e. before the grouping of n fields, comprises three service channels, so that a 32-channel field has 29 data channels. The rhythm, the field and multi-field locking words and the semaphore channel are carried in the service channels. The data channels carry the communications data. When a data channel is not engaged, it carries the rhythm.

The information transmission system of the invention in which the service channels carry the rhythm signal, the field and multi-field locking words and the semaphore channel is noteworthy in that the rhythm signal is transmitted at the very start of the multiplex field.

Another feature of the transmission system is that the channel status information (free or engaged) and the number of the last channel in use are transmitted in the multiplex.

The service channels are invariably grouped at the start of the field, so that the field structure thus defined is:

channel 0 which, in the invention, invariably carries the rhythm.

The rhythm signal is produced by a clock at half bit frequency, so that, when very few channels are in use, the distant station can be properly resynchronised before the arrival of the first significant information.

Channel 1 which comprises the field locking word and the number of the last channel in use.

Channel 2 which comprises the multi-field locking word, the channel status signallings channel by channel and the semaphore channel.

In the example, the field contains 32 channels numbered from V0 to V31, and each channel has an octet, i.e. 8 bits available.

The multi-field comprises 32 fields numbered from 0 to 31.

In channel 1, the field locking word is present in every other field, e.g. in the even-numbered fields. Likewise, the number of the last channel in use is present in every other field, in the odd-numbered ones.

Channel 2 is divided between different lines:
the semaphore line during the odd-numbered fields;
the multi-field locking word during field 0;
the signallings, channel by channel, during the even-numbered fields from 3 to 30. The signallings of 2 channels are transmitted in an octet:
a0 b0 c0 d0 a1 b1 c1 d1.

There are 4 signalling bits per channel. Bits a0, b0, c0 and d0 represent the signalling of the channel with the same number of the field and bits a1, b1, c1 and d1 represent the signalling of the channel with the same number as the field plus one.

Bits a, b, and c represent the signalling of the junction unit or the equipment to which the channel has been allocated, with bit d representing the status of the channel.

Channels 3 to 31 are allocated to the subscribers.
The multiplex configuration is thus:

|  | Ch. No. | | | |
| --- | --- | --- | --- | --- |
| Field No. | V0 | V1 | V2 | V3 to V31 |
| 0 | rhythm | Field lock (VT) | Multi-field lock (VMT) | Voice channels |
| 1 | rhythm | Last ch. No. (LCN) | Semaphore ch. (CS) | Voice channels |
| 2 | rhythm | VT | Signalling ch. 2 + 3 | Voice channels |
| 3 | rhythm | LCN | CS | Voice channels |
| 4 | rhythm | T | Signalling ch. 4 + 5 | Voice channels |
| 5 | rhythm | LCN | CS | Voice channels |
| 27 | rhythm | LCN | CS | Voice channels |
| 28 | rhythm | VT | Signalling ch. 28 + 29 | Voice channels |
| 29 | rhythm | LCN | CS | Voice channels |
| 30 | rhythm | VT | Signalling ch. 30 + 31 | Voice channels |
| 31 | rhythm | LCN | CS | Voice channels |

-continued

| Field No. | Ch. No. | | | |
|---|---|---|---|---|
| | V0 | V1 | V2 | V3 to V31 |
| 0 | rhythm | VT | VMT | Voice channels |

The field lock octet is selected so that there can be no initation by the octet containing the number of the last channel used. There is no problem here since only 5 bits are needed to transmit this number, giving the following example of a configuration:

| field lock octet | 10011011 |
|---|---|
| last channel No. octet | 111 NDV |

NDV = number of the last channel used.

Figure 3:
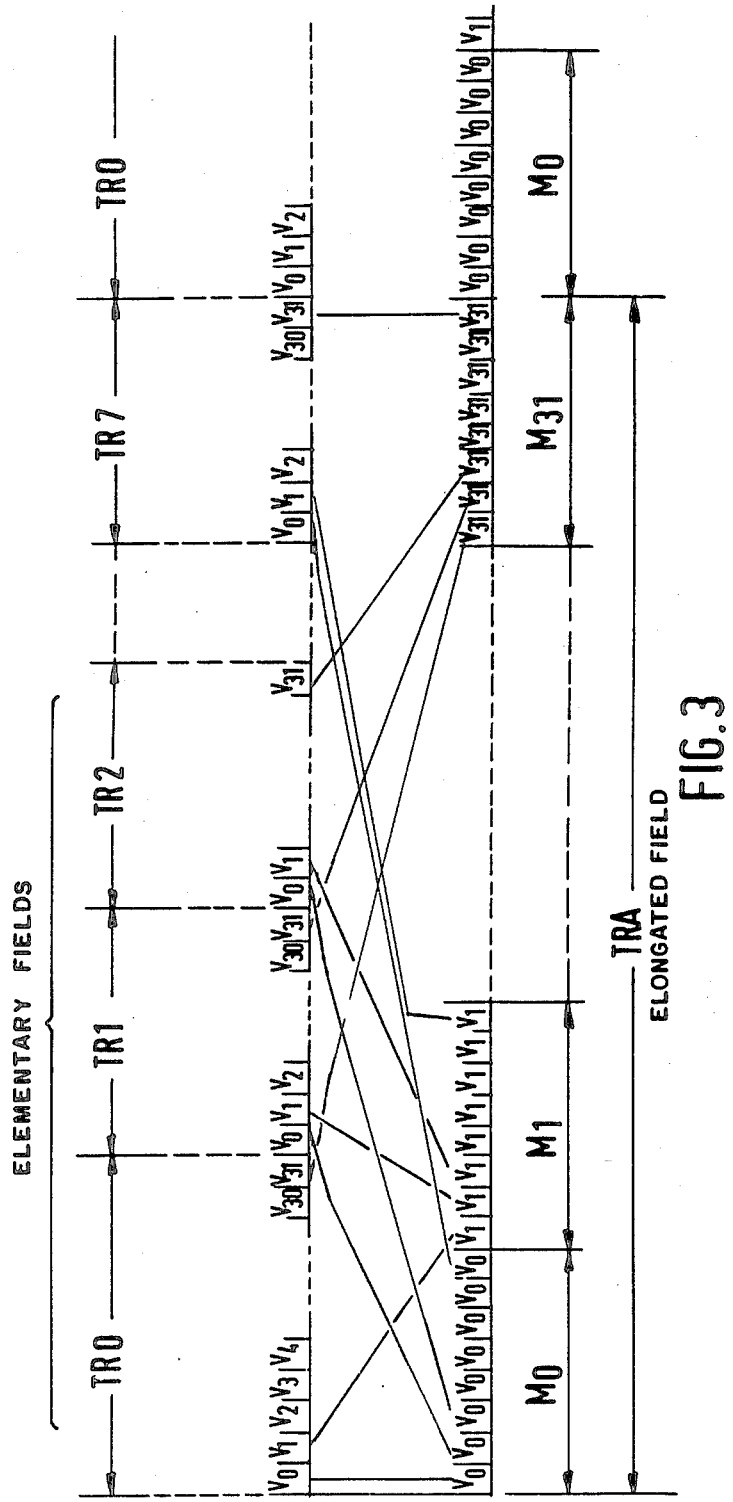
FIG. 3 shows the conversion of an elementary into an elongated field.

FIG. 3 shows the conversion of an elementary into an elongated field. In the example described, 8 fields have been grouped according to the invention.

The referenced channels of each elementary field number 32: V0, V1, V2, V3, V4, ... V30, V31. The elementary fields are grouped by n=8: TR0, TR1, TR2, ... TR7, to constitute an elonaged field TRA. Once the n=8 elementary fields have been grouped to form an elongated field, the channels V of the elementary multiplex are assembled side-by-side in groups of 8 channels: 8V0, 8V1, ... 8V31. The channels of the elongated multiplex are referenced M, thus channel M0 contains 8 elementary channels V0, channel M1 contains 8 elementary channels V1, ... and channel M31 contains 8 elementary channels., V31

Figure 4A:
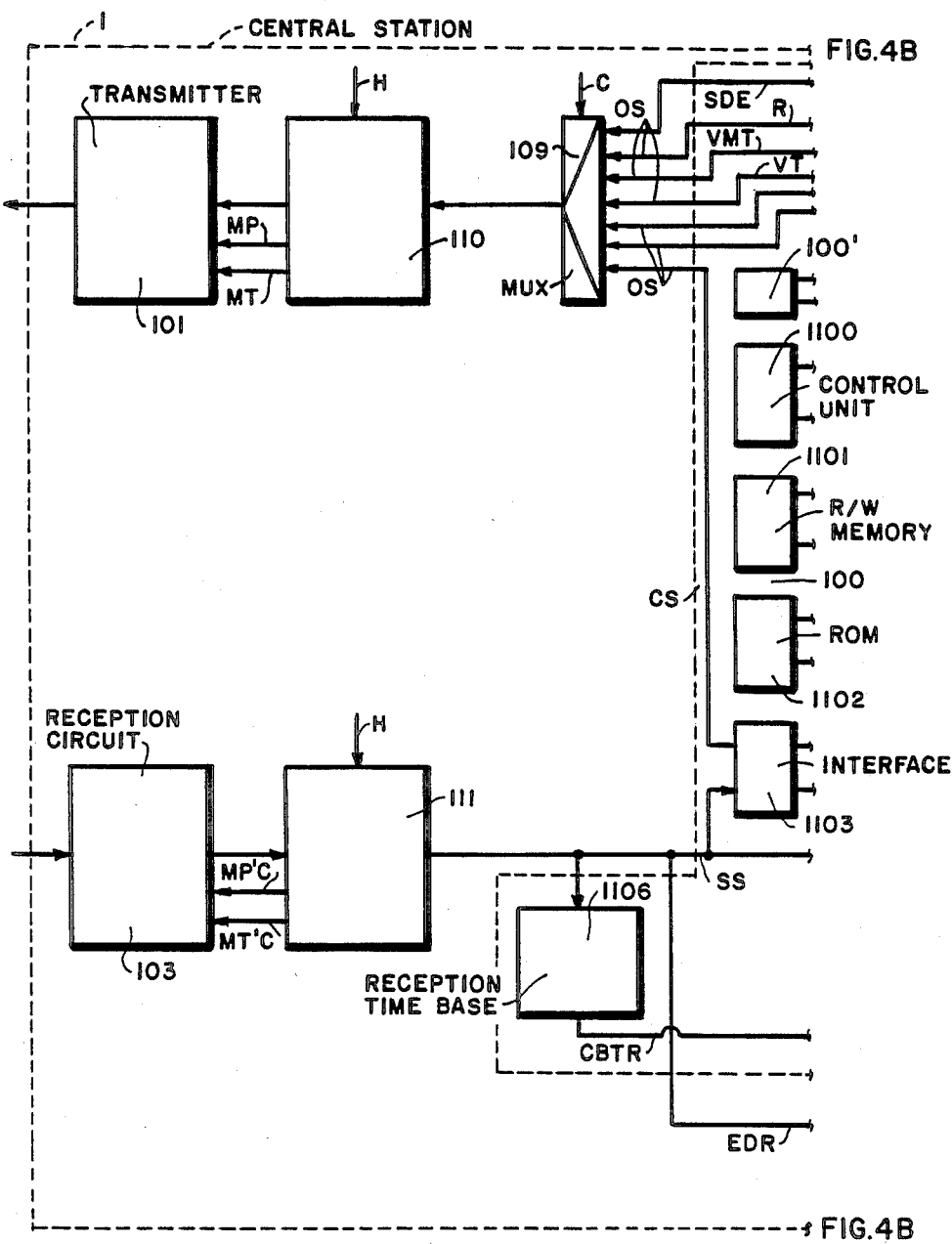
FIGS. 4A and 4B are a proposal for a display diagram of a central station.
Figures 4A, 4B:
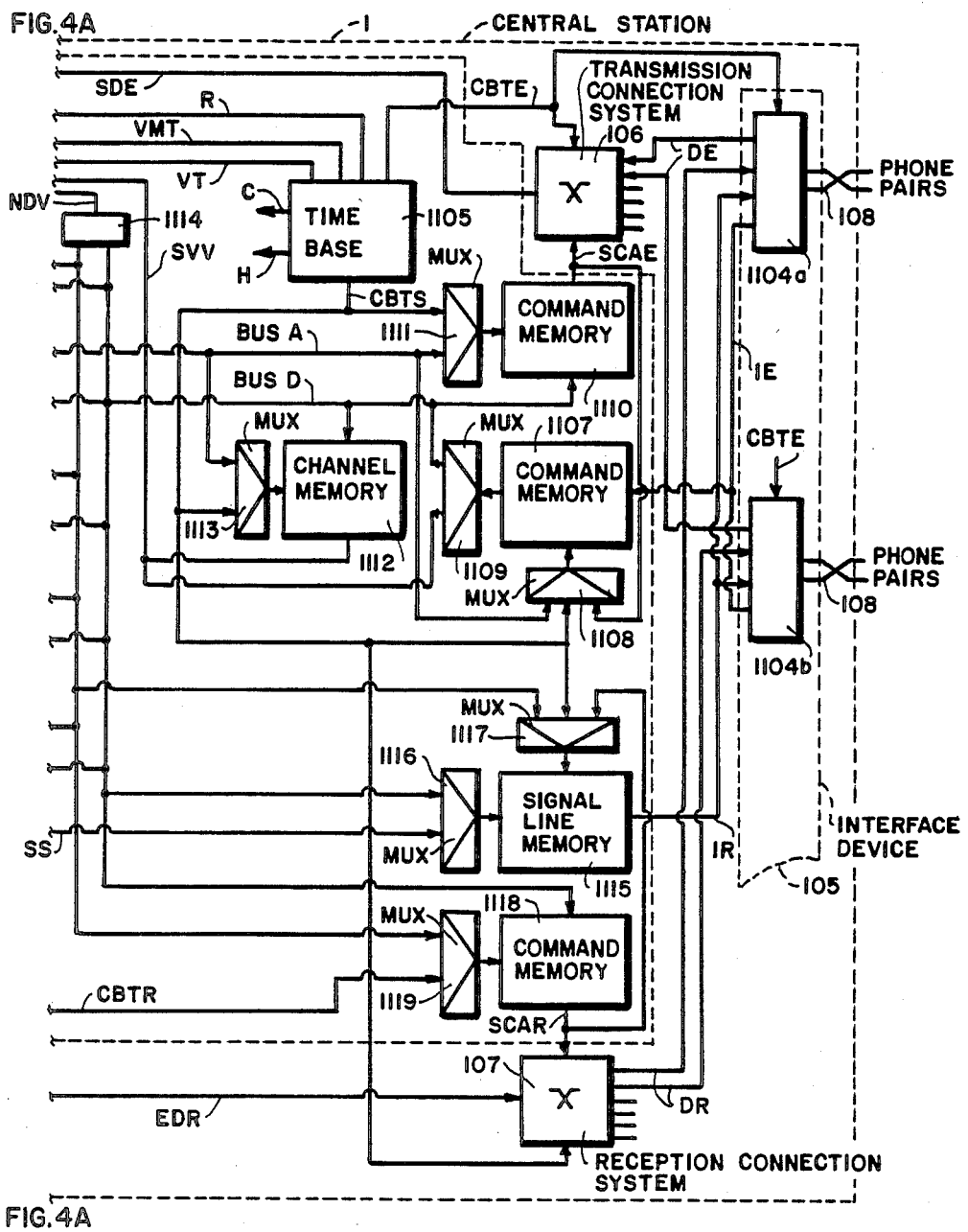

FIGS. 4A and 4B put forward a diagram of central station 1. Control and memory device 100 is monitored by a control unit 1100 arranged around a micro-processor. It is fitted with an address line BUSA and a data line BUSD and is thus associated with read/write memories (RAM) 1101, read-only memories (ROM) 1102 and an interface box 1103 for the running of the semaphore channel facilitating dialogue between the central and distant stations. Interface device 105 consists of junctions 1104a, 1104b, etc., providing the link between central station 1 and the automatic selector in the telephone exchange (not shown) using telephone pairs 108. There are as many junctions as there are subscribers' lines to be connected. Control and memory device 100 has a transmission time base 1105 which provides control signals CBTE for the various junctions 1104a, 1104b, etc. for the purposes of coding and decoding the l.f. voice signals, recovering the transmitted signals (loop statuses) and issuing orders (bells, rating, battery reversal) which are detected on the link lines to the telephone exchange. Control signal CBTE also controls time transmission connection system 106. Device 100 also has a reception time base 1106.

The voice channels are concentrated on the multiplex link lines after the detection of the lifting of hit set by a subscriber at a distant station, the data's being transmitted by the semaphore channel, or information on a new call generated by the automatic selector in the telephone exchange (not shown). The new call is detected by device 100 via an order memory 1107 preceded by a multiplexer 1108 into which all the orders from the subscribers' junctions, signal IE, are invariably written. Control unit 1100 periodically reads this order memory 1107 via a multiplexer 1109 and thus detects changes in status.

A channel is allocated to a junction by time connection system 106 and a command memory 1110 preceded by multiplexer 1111. The command memory 1110 of connection system 106 and multiplexer 1111 are located in device 100. Connection system 106 essentially consists of memories into which the coded l.f. channels from the junctions, signals DE, are systematically written. At the output of connection system 106 there is now only one 32-channel link, a signal SDE, if the selected multiplex has 32 channels. Concentration is brought about by reading, in the time set aside (signal CBTE produced by time base 1105) for the output channel, the content of the word corresponding to the input channel which is to be used. The read-out addresses are provided by command memory 1110, signals SCAE. To provide a channel, control unit 1100 thus writes the number of the input channel which it wishes to connect into memory 1110 at the address corresponding to the output channel. Read-out addresses SCAE supplied by memory 1110 also serve to write into command memory 1107 the signallings to the channels which have been concentrated (channel-by-channel signalling).

Correlatively, control unit 1100 writes the occupational status of the channels into a 32×1 bit channel occupation memory 1112, with which is associated a multiplexer 1113. This memory is read at the same time as command memory 1107, in this manner, channel-by-channel signalling transmits the status of the channel, free or engaged, at the same time as the signalling of the junction which has been connected. Read-in and write-out of command memories 1107, control memory 1110 and channel occupation memory 1112 take place in synchronism with transmission time base 1105, signal CBTS.

Multiplexer 109 makes it possible to collect on the multiplex link the voice channels, output signals SDE of connection system 106 and the commands and signallings from channels OS, which are:

Channel-by-channel signalling SVV transmitted by command 1107 and channel occupation 1112 memories which, together with control unit 1100, constitute the means of detecting free or engaged channels.

The semaphore channel transmitted by interface box 1103.

The number of the last channel used NDV, provided by control unit 1100 via circuit 1114 in which the number of the last channel used is entered.

The lock words of the field VT, and multi-field MVT and rhythm signal R, all produced by transmission time base 1105 (the field and multi-field lock words provide recognition of the various channels).

Multiplexer 109 is controlled by control signal C produced by transmission time base 1105.

The signal at the output of multiplexer 109 is transmitted to transmitter circuit 101.

Reception circuit 103 transmits the information received to time reception connection system 107, signal EDR, and to device 100, signals SS. Signals SS comprise the channel signallings transmitted to a signalling memory 1115 in device 100 and the information from the semaphore channel which is transmitted to interface box 1103. The information received also makes it possible to reconstitute reception time base 1106 from the field lock words contained in said information. This time base 1106 makes it possible to extract the various channels from the field and multi-field.

In device 100, signalling memory 1115 is preceded by multiplexers 1116 and 1117, whereas a command memory 1118, preceded by a multiplexer 1119, addresses time reception connection system 107 via address command signals SCAR.

Time reception connection system 107 and signalling memory 1115 operate in exactly the same way as time transmission connection system 106 and command memory 1107 on the transmission side. There is a single multiplex link, signal EDR, at the input of connection system 107, whereas the information received on a number of multiplex links, signals DR, is transmitted at its output. Control unit 1100 writes into command memory 1118 at the address corresponding to an input channel of connection system 107 the number of the output channels which it wishes to connect, defined at the time by control signal CBTR produced by reception time base 1106. Likewise the channel-by-channel signallings contained in the field are invariably written into signalling memory 1115 at addresses SCAR provided by command memory 1118. Thus reading out of command memory 1118 and thus the systematic write-in into connection system 107 and signalling memory 1115 take place in synchronism with reception time base 1106, signal CBTR, while the systematic read-out from signalling memory 1115 and connection system 107 take place in synchronism with transmission time base 1105, signal CBTS.

Control unit 1100 writes the stand-by code into the addresses corresponding to the junctions which are not connected to the input channels into signalling memory 1115. The connection is the same in the transmission and reception directions, the same channel is allocated to the same junction, signal IR.

According to one feature of the invention, control and memory device 100 works together with means 100' to bring about a procedure for grouping the engaged channels side-by-side in the multiplex field. In a preferred embodiment of the invention, means 100' are ROM into which are written the various statuses relating to the procedure (described with reference to FIG. 6) used to group the engaged channels side-by-side. Means 100' work together with the means of detecting free and engaged channels constituted by control unit 1100, command 1107 and channel occupation 1112 memories to set up said procedure. In particular, the microprocessor of control unit 1100 is in relation with means 100' via address line BUSA and data line BUSD.

In another feature of the invention, into central station 1, between multiplexer 109 and transmitter circuit 101, is inserted the device for converting the multiplex and controlling the transmitter circuit 110; likewise, the device for reconverting the multiplex and controlling the reception circuit 111 is inserted between reception circuit 103 and time reception connection system 107 on the one hand and control and memory device 100 on the other. A clock H, generated by transmission time base 1105, is used by devices 110 and 111. Device 110 transmits signals MT and MP to transmitter circuit 101, while device 111 transmits signals MT'C and MP'C to receiver circuit 103. Devices 110 and 111 will respectively be described with reference to FIGS. 7, 8 and 9, 10.

Figure 5A:
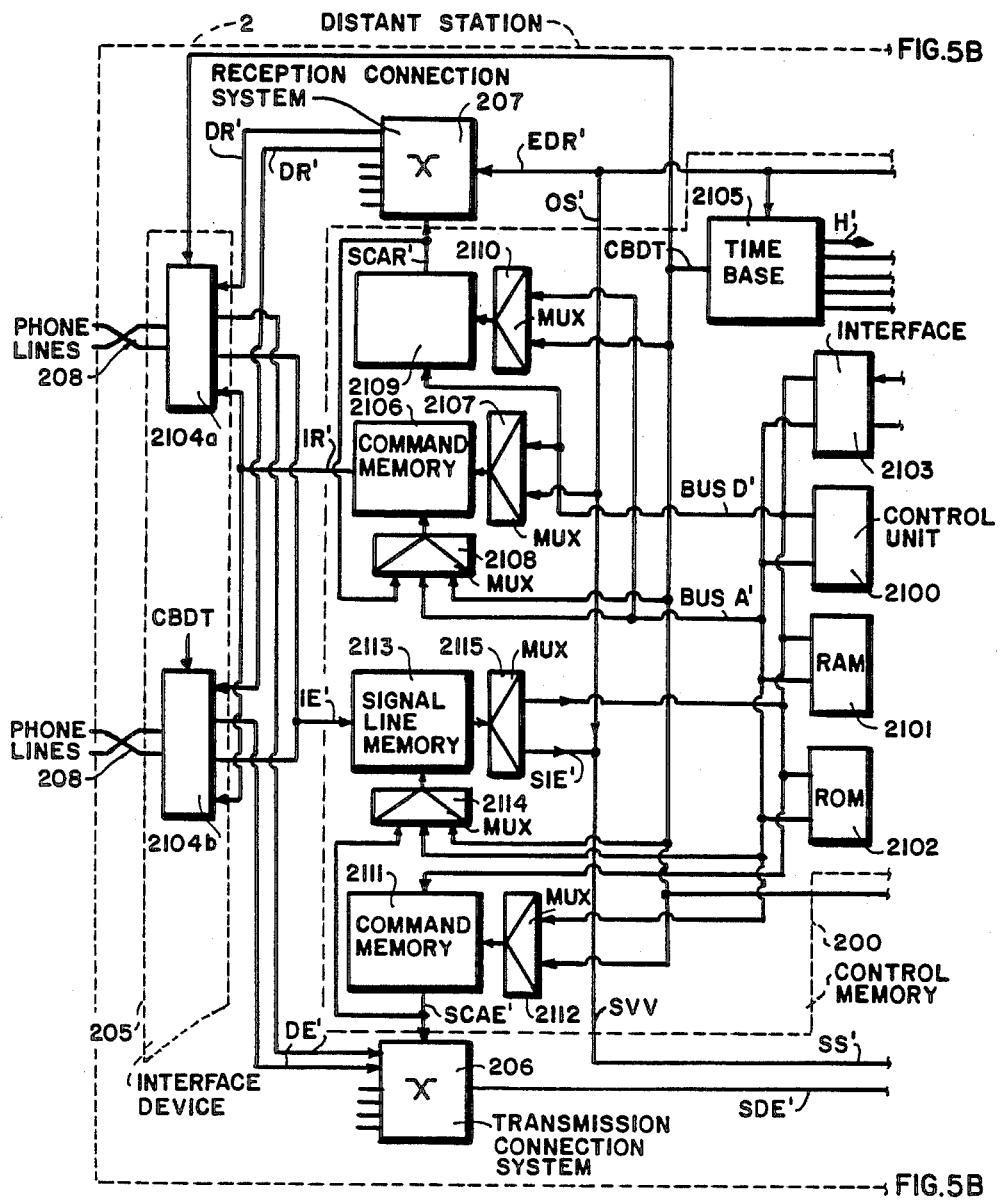
FIGS. 5A and 5B are a proposal for a display diagram of a distant station.
Figures 5A, 5B:
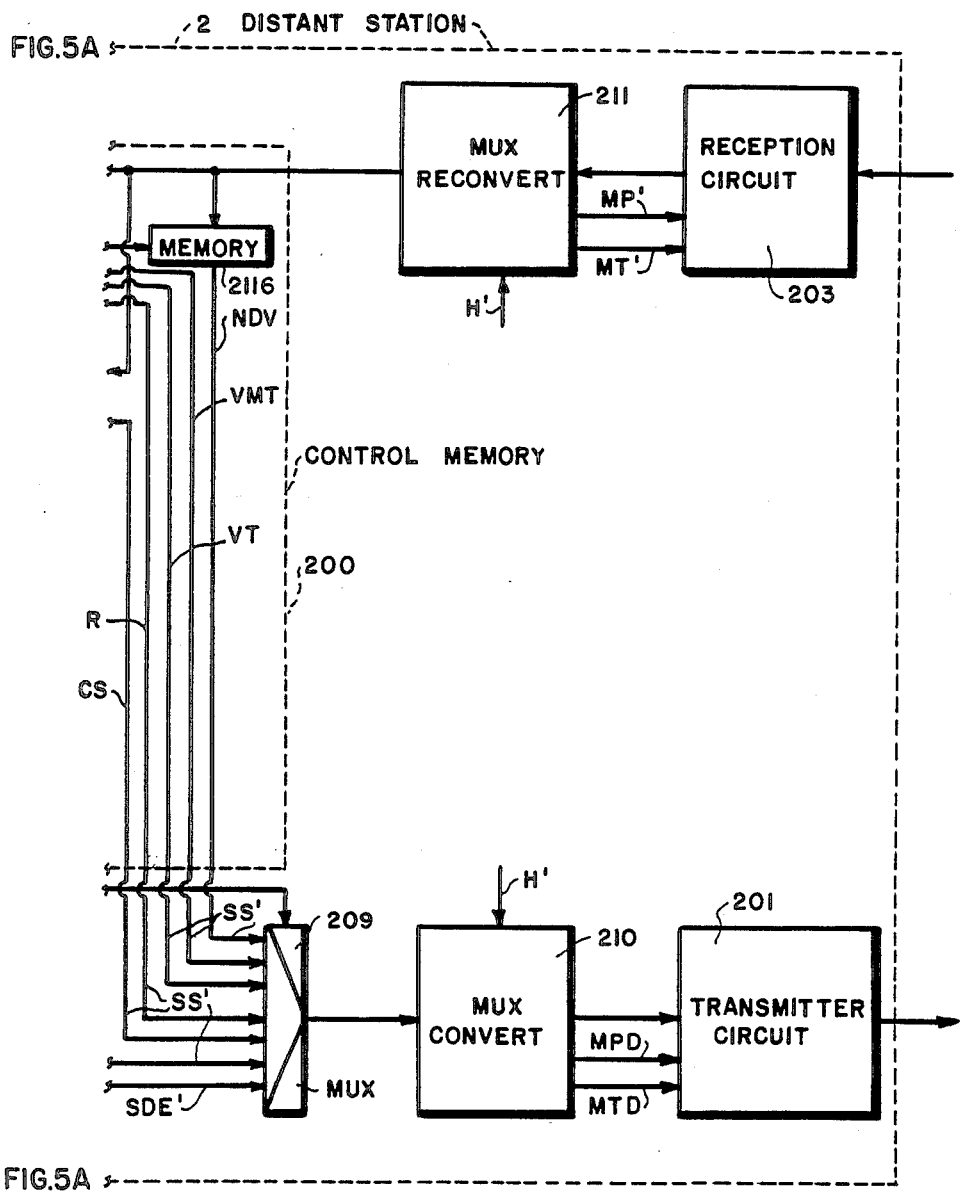

FIGS. 5A and 5B put forward a diagram of distant station 2, the structure of which is symmetrical with that of central station 1. Control and memory device 200 is monitored by a control unit 2100 arranged around a microprocessor. Control unit 2100 has an address line BUSA' and a data line BUSD' and is thus associated with RAM 2101, ROM 2102 and an interface box 2103 to run the semaphore channel. Interface device 205 provides the link between the distant station and the subscribers' sets via telephone pairs 208. It consists of junction circuits 2104a, 2104b, etc. There are as many junction circuits as subscribers' lines. Control and memory device 2100 has a single time base 2105, reconstituted from the multiplex received, which provides control signals CBDT to the various junction circuits 2104a, 2104b, etc. Likewise, the distant station has, on the reception side, a command memory 2106 preceded by multiplexers 2107 and 2108. All the commands (output signal IR') concerning the subscribers' junction circuits from the multiplex field received (signals OS') and the data supplied by control unit 2100 in synchronism with signal CBDT provided by time base 2105 are systematically written into memory 2106 at the addresses supplied by control unit 2100. The occupied channel signalling is also reinjected to the transmission side via multiplexer 209. A channel is allocated to a junction circuit via time reception connection system 207 and a command memory 2109 preceded by multiplexer 2110. Memory 2109 and multiplexer 2110 are located in device 200. At the input of time reception connection system 207 is transmitted received multiplex EDR', while at its output a number of multiplex links DR' is transmitted to the various junction circuits. Write addresses SCAR' are provided by command memory 2109. In order to allocate a channel, control unit 2100 writes the number of the input channel which it wishes to connect into memory 2109 at the address corresponding to the output channel, in synchronism with signal CBDT produced by time base 2105. Write addresses SCAR' supplied by memory 2109 also serve to write the channel signalling into command memory 2106.

The data to be transmitted DE' from the various junction circuits are sent to the inputs of time transmission connection system 206, at the output of which signal SDE' is transmitted on a single multiplex link to multiplexer 209. Command memory 2111 preceded by multiplexer 2112 is written at the addresses defined by control unit 2100 in synchronism with signal CBDT provided by time base 2105. Memory 2111 addresses connection system 206 by means of address command signals SCAE'. Likewise, signals IE' from the junction circuits are transmitted to signalling memory 2113 associated with multiplexers 2114 and 2115. The channel-by-channel signallings are written into signalling memory 2113 in synchronism with signal CBDT of time base 2105. Memory 2113 is read by control unit 2100 at the addresses defined by control unit 2100 to detect the lifting of handsets. Memory 2113 is also read from addresses SCAE' provided by command memory 2111 and signallings SIE' are then transmitted to multiplexer 209, which is controlled by signal CBDT and collects the voice channels, signals SDE' and the various signallings SS' on the multiplex link, the latter being broken down thus:

Channel-by-channel signalling SVV resulting from signals SIE' and the occupation signallings of the channels.

Semaphore channel CS transmitted by interface box 2103 which receives the information (signals OS') from the multiplex field issued by the central station.

The lock words for the field VT and multi-field VMT and rhythm signal R from reconstituted time base 2105.

The number of the last line used NDV from circuit 2116. The number of the last line used is extracted from the multiplex field issued by the central station, written into circuit 2116 and retransmitted to multiplexer 209 in synchronism with time base 2105.

According to another feature of the invention, into distant station 2, between multiplexer 209 and transmitter circuit 201, is inserted multiplex conversion and transmitter circuit control device 210. Likewise, between reception circuit 203 and time reception connection system 207 on the one hand and control and memory device 200 on the other is inserted multiplex reconversion and reception circuit control device 211. A clock H' emitted by reconstituted time base 2105 is used by devices 210 and 211. Devices 210 and 211 are identical to devices 110 and 111 respectively in the central station. Device 210 emits signals MTD and MPD to transmitter circuit 210, while device 211 transmits signals MT' and MP' to reception circuit 203.

With the description of the distant station completed, it should be noted that a few differences appear beyond the existing symmetry between the central and distant stations. The distant station is in fact synchronous with the central one, so that time base 2105 recovered on reception is unique and thus also used on transmission. The control of time connection systems 206 and 207 is also specified by the central station. The number of the last channel used written into circuit 2116 whichis retransmitted in the transmitted field is taken from the received field. The occupation of the channels, retransmitted in channel-by-channel signalling, is the same as that received in the incident transmission, and is therefore a copy of the channel signalling written into command memory 2106.

Figure 6:
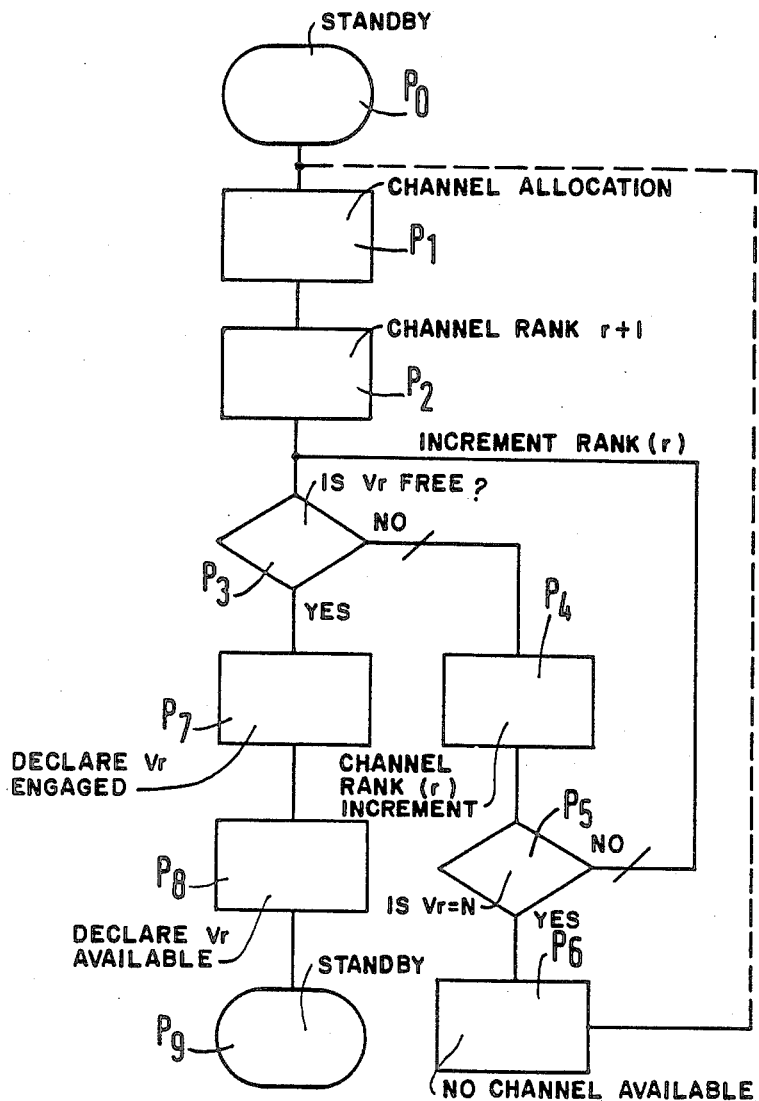
FIG. 6 describes a procedure used to group the engaged channels in the multiplex in a certain configuration.

FIG. 6 proposes a diagram of the application of a procedure created to group the channels engaged in the multiplex in a given configuration, in accordance with the invention.

The channels are allocated on the multiplex by the central station on the detection of an incoming call from the telephone exchange or when a subscriber connected to a distance station lifts his handset.

In the example of an application below, and to aid understanding, channels V0 to Vi of the multiplex are service channels (rhythm, field and multi-field synchronisation and signalling) and are always present in the fields. Channels Vi+1 to Vn of the multiplex are data channels varying between "free" and "engaged". A data channel is regarded as engaged when a communication has been associated with it. All the data channels are "free" when the network is commissioned.

The service channels are always allocated at the start of the field and, in order to make best use of the field, the central station allocates the data channels to the lowest priority from Vi+1 to Vn on establishing communications.

There are two possible cases for taking account of calls: the call comes either from the telephone exchange, or from a subscriber connected to a distant station (at the moment when the subscriber lifts his handset). The procedure for allocating a channel is the same in both cases and the diagram of FIG. 6 provides a system for both. The procedure to be described is created in device 100 via the means for detecting free or engaged channels and by means 100' containing the various statuses of said procedure.

In the first cas described, the call is transmitted by the telephone exchange. In the initial state P0, the associated junction is on stand-by. The incoming call from the telephone exchange then sets up status P1, when a channel allocation procedure must be followed so that, according to the invention, the data channels may be grouped side-by-side, for instance at the start of the field, with the service channels automatically allocated to the first three. In the field channel application procedure, r, i and n represent the rank of a channel, i+1 is the first rank which can be allocated to a data channel, n is the last, and r the one specified at the time of allocation. The first possible rank after i is r=i+1, when status P2 arises. A question arises immediately afterwards in status P3: is channel Vr of rank r free? If not, one unit is added to rank r and rank r+1 is tested. This gives rise to status P4. A further question of rank then arises in status P5. Is the tested rank higher than n (the last possible one)? If so, allocation is refused, status P6. All channels are engaged and the caller must repeat the call. If not, however, i.e. if the tested rank is lower than n, the system returns to status P3: is the channel of the new rank tested free? If it is engaged, the procedure is repeated via statuses P4 and P5 as long as no free channel is found or while allocation is not refused (state P6). When the rested rank is free, status P7 arises, the tested channel is declared engaged (transmission of an engaged bit for the channel) and allocation is accepted: the junction is put through. At the end of the communication, the channel used is freed: this is status P8, the channel is declared free (transmission of the channel engaged bit). The last status /9 is equivalent to status P0, i.e. the junction is again on stand-by.

The procedure for the second case is fully identical. In the initial state P0 the subscriber's set is on stand-by and status Pi is produced when he picks up his handset. Statuses P2, P3, P4, P5, P6,P7 and P8 are those described for the first case. Status P9 is also equivalent to the initial status P0, i.e. the subscriber's set is once more on stand-by.

In this method of operation, it is possible that few channels are in used but the last channel used is at the end of the field. The central station control unit knows the occupation of the channels and their allocation to the subscribers. If this configuration lasts too long, the control unit reallocates the channels so as to collect the engaged channels at the start of the field.

Thus, if traffic is heavy or calls take a long time, certain high-ranking communications channels may be engaged while a large number of lower-ranking ones have become free. The central station decides to reorganise the field in order to group the communications on low-ranking data channels.

This process consists in taking the communications associated with high-ranking channels and replacing them on free low-ranking channels, depending on a set of parameters linked to the system channel concerned, viz:

N: number of current communications;
Vh: highest-ranking engaged channel;
h: rank of channel Vh;
D average duration of a communication during the past hour (expressed in hundredths of an hour);
C: number of communications established during the past hour.

The organisation of the field is analysed at the end of a time D. Its reorganisation is decided only if the condition below applies:

$$\frac{C \times D}{(h-i) - N} \cong x \text{ ($x$ is selected by the operator)}.$$

This condition expresses the ratio between the number of communications which may be established during the period D to come and the number of free communications channels between Vi and etVh. While this ratio is 1 or more, it is not expedient to dictate a reorganisation of the multiplex. If, however, it becomes much lower than 1, reorganisation is imperative.

If reorganisation conditions exist, the central station software transfers the communications associated with the highest-ranking channels to the free lower-ranking ones, beginning with the communication associated with the highest-ranking engaged channel Vh.

Figure 7:
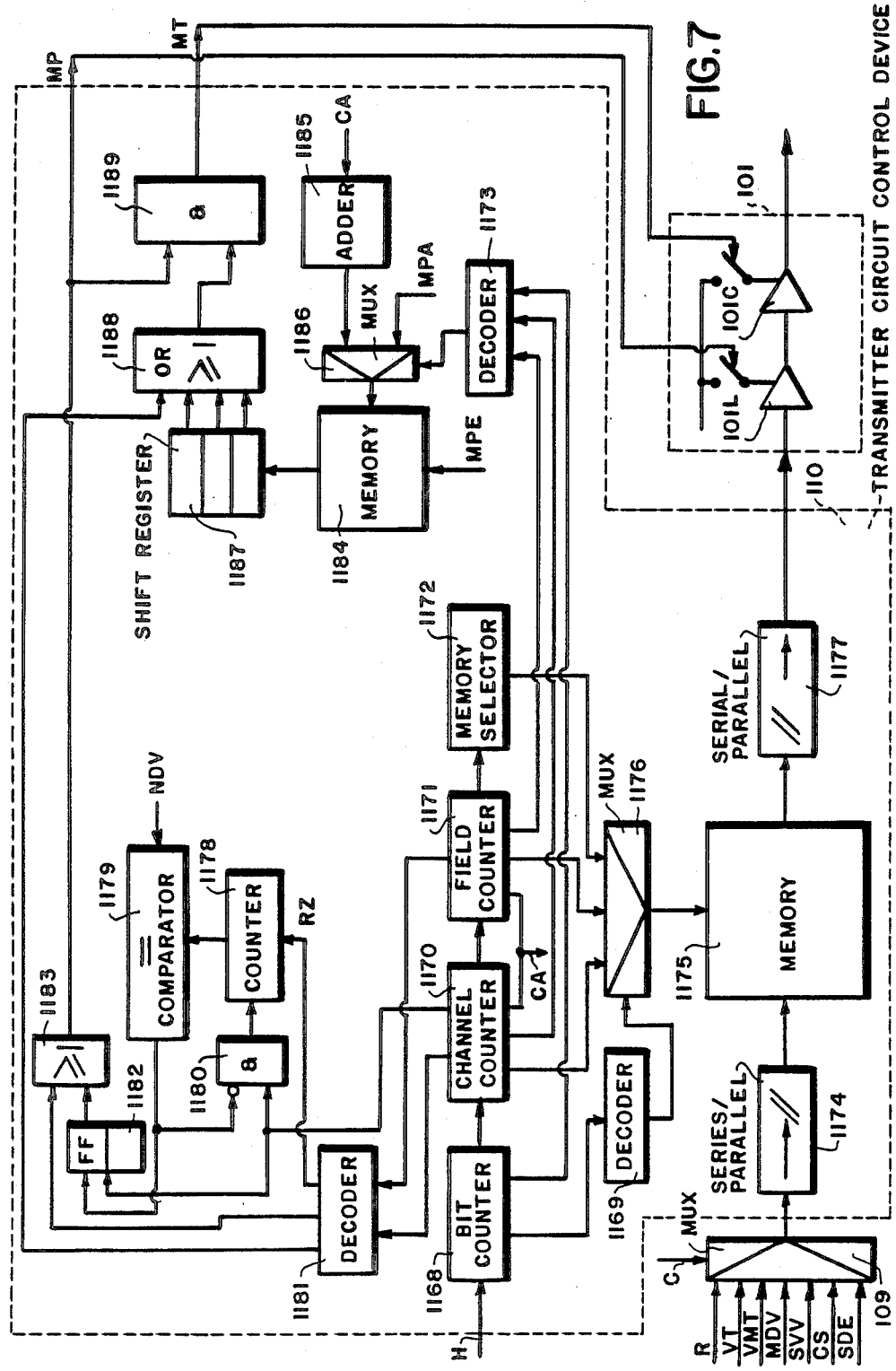
FIGS. 7 and 8 give a proposal for a display diagram of a device for converting the multiplex and for controlling the transmission circuit.

FIG. 7 proposes a diagram of the multiplex conversion and transmitter circuit control device 110, which is identical to device 210.

The transmission system is noteworthy in that it has means for reducing the power consumption of the transmitter and reception circuit and power them normally on the detection of engaged channels. The means for detecting free or engaged channels were described in the description of the central station with reference to FIG. 4. They consist of control unit 1100 and command and channel occupation memories 1107 and 1112 respectively.

As stated in the preamble, however, the response time to the start-up of the transmission and reception circuits is not negligible compared with the duration of a multiplex field used generally for this type of equipment (e.g. the recurrence of a 32-channel multiplex is 125 μs). In order, therefore, to reduce the effect of their response time and thus to increase the power saving with advantage, the multiplex field is otherwise organised.

To this end, the transmission system comprises means for grouping the elementary multiplex fields n by n and side-by-side in the new fields thus obtained. The (e.g. 32-channel) elementary multiplex field is converted into a field n times longer and the n channels of the same rank are grouped side-by-side. There is a set of counters consisting of a bit counter 1168, a channel counter 1170, a field counter 1171, and a memory selector 1172 facilitating the addressing of a part of a memory. These four counters are synchronous with the clock pulse H issued by time base 1105 (FIG. 4B) and in phase in relation to the field (they may form part of time base (1105). Multiplexer 109 controlled by signal C from time base 1105 (FIG. 4B) makes it possible to insert various signals in the elementary field (before the fields are grouped n by n), e.g. rhythm signal R, lock words for the field VT and the multi-field VMT, the number of the last channel used NDV, channel status signals SVV, semaphore channel CS and the signals relating to the data channels SDE. The output of multiplexer 109 is connected to the input of a series-parallel converter 1174, the output of which is connected to a memory circuit 1175. The elementary multiplex is converted into an elongated one by memory 1175 which may contain twice n fields. Half of the memory contains the n fields of the elementary multiplex in the order of their arrival, while during this write-in time, the other half of the memory is read out in a different order to constitute the elongated multiplex. Memory 1175 is monitored by the various address signals from counters 1170 and 1171 and selector 1172, facilitating a choice of the half of the memory concerned, while all the signals are multiplexed by multiplexer 1176. The access time to memory 1175 at the rate of the channels V is divided into two: one for write-in and one for read-out. Multiplexer 1176 is controlled from a decoding circuit 1169 controlled from the signals of bit counter 1168.

An operative example in which the selected figure, $n = 8$, is not limitative, is proposed here to explain the process.

Channel counter 1170 provides address wires A0, A1, A2, A3 and A4 by means of which the channels of the initial elementary multiplex can be traced, while field counter 1171 provides address wires A5, A6 and A7 by means of which the $n = 8$ fields to constitute the elongated multiplex may be traced. "memory selector" 1172 provides address wire A8 indicating the part of the memory concerned.

Writing into the memory is done into the half indicated by the status of A8 at the addresses dictated by commands A0, A1, A2, A3, A4, A5, A6 and A7.

The memory is read out in the half indicated by the status of the addresses dictated by commands A3, A4, A5, A7, A0, A1 and A2.

Writing into the memory is thus done in the order for an elementary 32-channel multiplex after it has been decided to elongate it 8 times:

0, 1, 2, 3, 4, 5, 6, 7, 8, 9, . . . , 253, 254, 255, whilst read-out takes place in the order:

0, 32, 64, 96, 128, 160, 192, 224, 1, 33, 65, . . . , 225, . . . , 255.

The output of memory 1175 is then connected to a parallel-series converter 1177, the output of which is connected to transmission circuit 101.

On transmission, then, the conventional elementary field is elongated and the transmission commands are then drawn up. On reception, it will be shown with reference to FIG. 9 how the receiver commands are drawn up from the elongated field received and how this elongated field is reconverted into a conventional elementary field.

According to one of the features of the transmission system, channel status information (free or engaged) and the number of the last channel used, on transmission are used to draw up the signals to cut off and power the transmission and reception circuits partly or fully.

The information transmission system is also noteworthy in that, then the transmission of the channel status information is used to cut off and power the transmission and reception circuits partly or wholly, the emission of a data channel after several free channels is immediately preceded by the emission of a rhythm channel.

At present each channel lasts for the time of n elementary channels and the channel validation information is used to switch on and off units 101L (signal MP) and 101C (signal MT) of transmission circuit 101 instead of basing switch-off solely on the rank of the last channel used.

The partial start command for the transmission circuit is drawn up from a counter 1178 and a comparator 1179 which continuously compared the state of this counter with the number of the last channel used NDV. Signal NDV is taken at the input of multiplexer 109, and is thus always present at the input of comparator 1179. The emission frequency of the information on the channels from channel counter 1170 is the clock which is applied to one input of an AND circuit 1180, to the other input of which is applied the inverted output signal of comparator 1179, so that the output signal of circuit 1180 makes it possible to advance the counter at the clock rate. As soon as the number of the last channel used is equal to the state of counter 1178, the latter is stopped. The signal from field counter 1171 decoded by decoder 1181 makes it possible to zero counter 1178 (signal RZ) after detection of the last channel of the field. The output of comparator 1179 is applied to the input of a flip-flop 1182, the second input of which receives the clock pulse emitted at the transmission frequency of the information on the channels. Thus the output of flip-flop 1182 controls the partial start-up of the transmission circuit. The output of flip-flop 1182 is connected to an input of an OR circuit 1183, a time is imposed on the second input of OR circuit 1183 obtained by decoding the time base signals (decoder 1181) and lasts for the last three channels of the field. The signal at the output of circuit 1183 thus ensures a partial start three channels before the start of the field (signal MP).

Full starting is provided from 32×1 bit memory 1184 containing the channel occupation. Writing into this memory is carried out by a micro-processor (signal MPE) which may be that of control unit 100 (here, all that is needed is to connect and use data line BUSD). It is read under the control of addresses CA (using the above example: A3, A4, A5, A6, A7). The memory access time is divided into two: a part for write-in and one for read-out. Writing-in is performed by the microprocessor only when it is to change the content of the memory (allocation or cancellation of a channel). To this end, the micro-processor supplies, at its address bus MPA (or BUSA, which is all that need be connected if control unit 100 is used), the address in which it wishes to write and, on its data bus MPE, the new information to be written in. This separation between the write-in and read-out times is brought about by means of a multiplexer 1186, at the input of which are the read-out and write-in addresses. The command to this multiplexer comes from a decoding circuit 1173, the inputs of which come from counters 1168, 1170 and 1171. The memory is systematically read on the command of addresses CA at the output of counters 1170 and 1171 two channels ahead. Addresses CA, controlling the read-out from memory 1184, presented to the input of adder circuit 1185, are provided by adder circuit 1185 two stages aheas, as the circuit automatically staggers addresses CA by 2 steps. The output of circuit 1185 is connected to one input of multiplexer 1186, the second of which receives the microprocessor address signal (signal MPA, or address line BUSA), with the output of the multiplexer connected to memory 1184. The output of the memoryis connected to the input of a shift register 1187. The result of read-out is memorised three times in order to control start-up two channels ahead of the actually engaged channel and thus to make it possible to emit a rhythm channel before said channel. Three of the inputsof an OR circuit 1188 are connected to the three outputs of register 1187 representing the read-out from the memory plus the two previous read-outs. A fourth input of this OR circuit 1188 receives a time command from decoding circuit 1181. The length of this time corresponds to the last channel of the field (i.e. the channel preceding the new field) and to the three service channels M0, M1 and M2. The output of OR circuit 1188 is connected to the input of an AND circuit 1189 which controls full start-up (signal MT) of transmission circuit 101 when its second input sees the active partial start-up signal (MP) thus validating full start-up.

The dealy of 20 $\mu$s in relation to the control of units 101C is taken by way of example, If this control acts solely on the output amplifiers, the response time is negligible. Here, total start-up command MT should arrive at the actual time of transmission. On the diagram of figure 7, it is necessary merely to read out memory 1184 with a slight advance. Circuit 1185 then shifts addresses CA by one step and shift register 1187 comprises only two stages: the result of the read-out from memory 1184 is memorised twice. The two outputs of register 1187 are connected to two inputs of OR circuit 1188. The time from circuit 1181 and forwarded to the third input of OR circuit 1188 corresponds only to the three service channels M0, M1 and M2. In these conditions, transmission thus begins at the start of the field (channel M0) and, if several channels are free, it begins one channel before the first engaged channel following, thus making it possible to transmit the rhythm sequence during this channel.

According to another feature of the invention, the transmission system is noteworthy in that the transmission of the number of the last channel used is used alone to draw up the signals to cut off and power the transmission and reception circuits partially or wholly.

Figure 8:
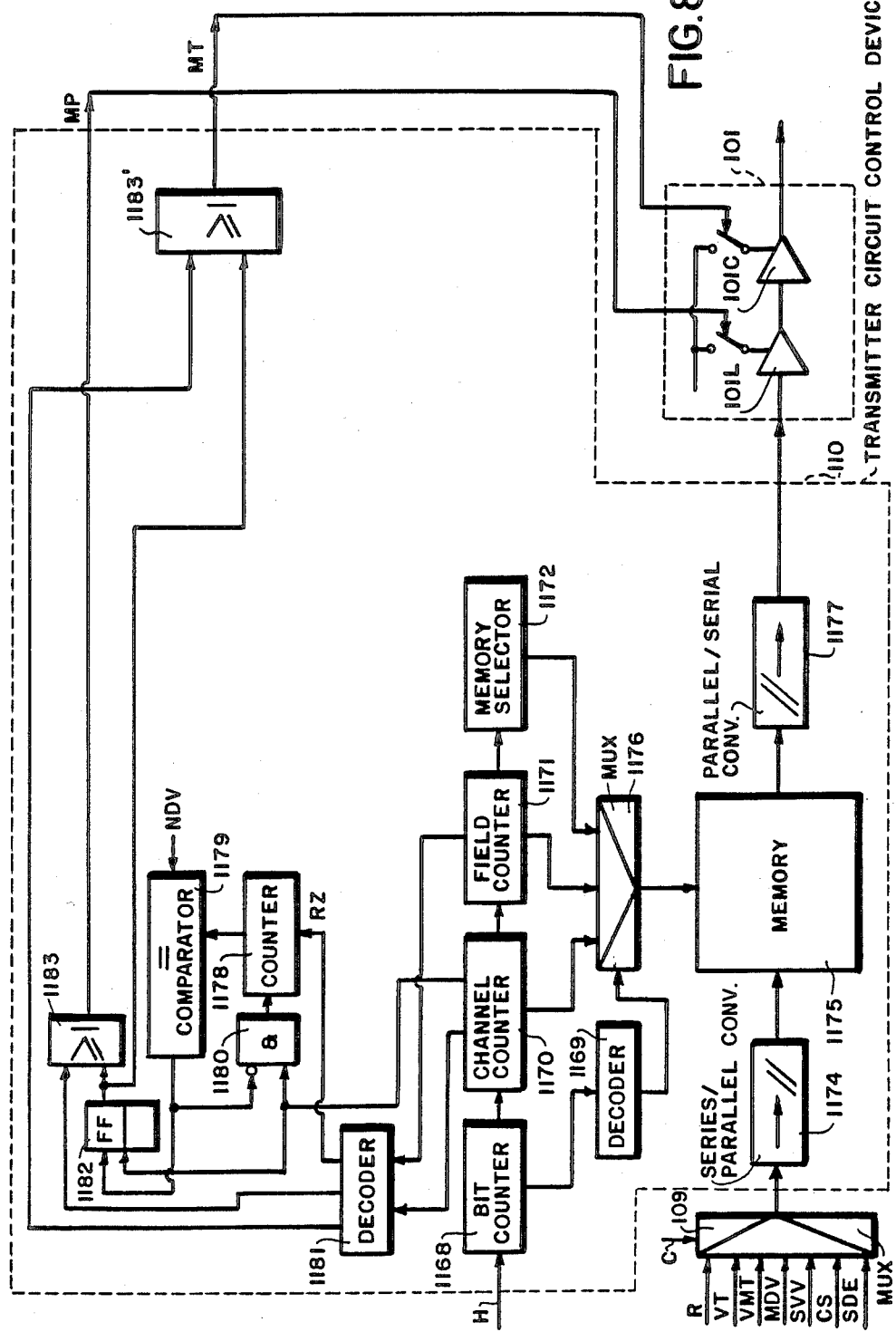

It is in fact possible, if desired, not to use the individual engaged channel information and draw up commands for device 101 solely from the information on the number of the last channel used NDV. Here, complete start-up is no longer commanded from the content of memory 1184 but from the information supplied by the output of flip-flop 1182 (see FIG. 8). If the response time of circuit 101C is equivalent to the duration of a channel, this signal is taken to the input of an OR circuit 1183' and a time is imposed on the second input of OR circuit 1183'. This time is supplied by decoding circuit 1181 from the signals from counters 1170 and 1171 and corresponds to the last channel of the field. Control signal MT is then at the output of circuit 1183'. If circuit 101C consists only of amplifiers, its response time is negligible, when control signal MT is issued directly by flip-flop 1182: transmission starts in channel M0 and continues uninterruptedly until the last engaged channel. The device of FIG. 8 is identical to that of FIG. 7 regarding the drawing up of the partial start-up signal and the multiplex conversion. Only the drawing up of the full start-up signal is different, for which circuits 1173, 1184, 1185, 1186, 1187, 1188 and 1189 and address signals CA are omitted or not used, while circuit 1183' is added.

Figure 9A:
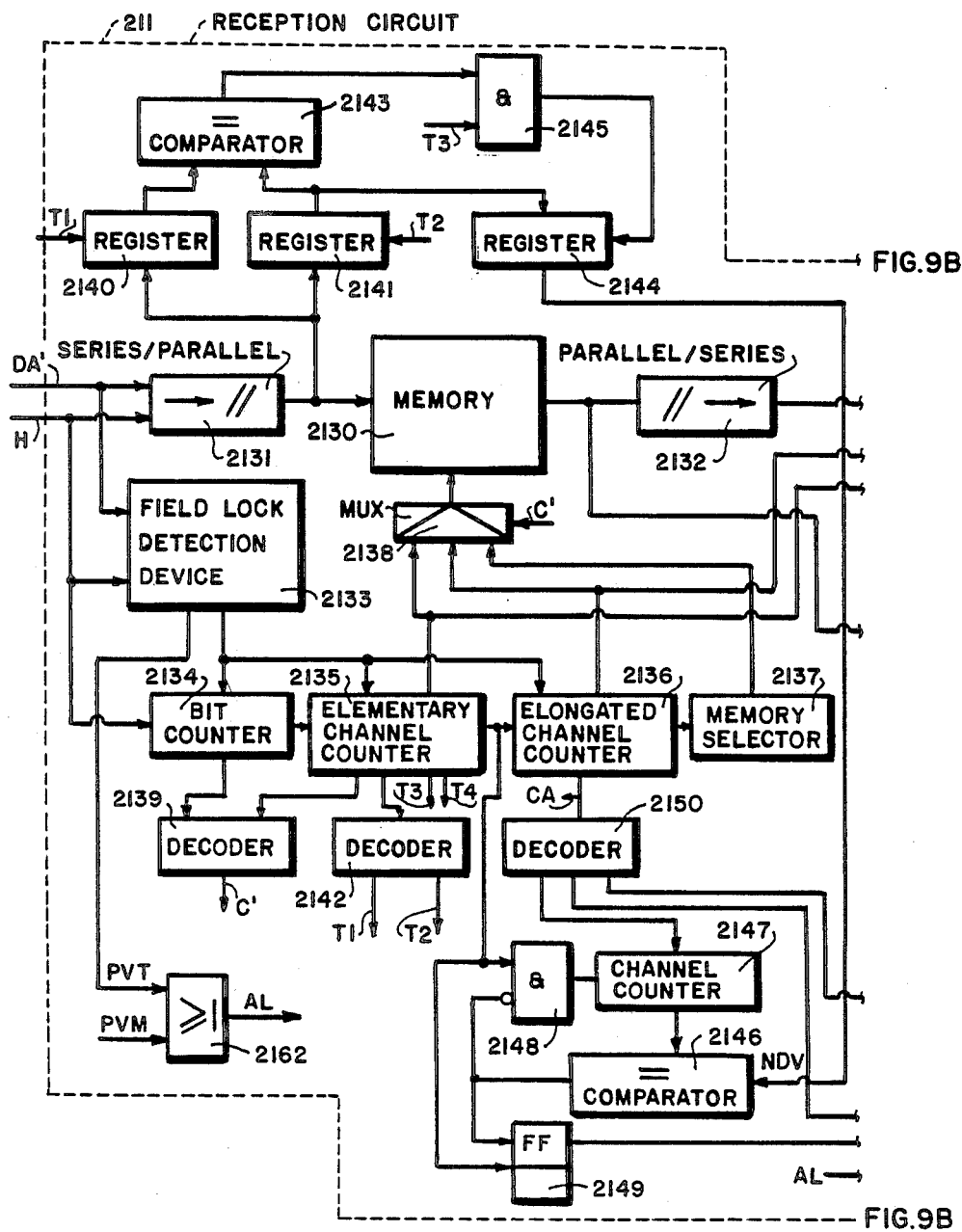
Figure 9B:
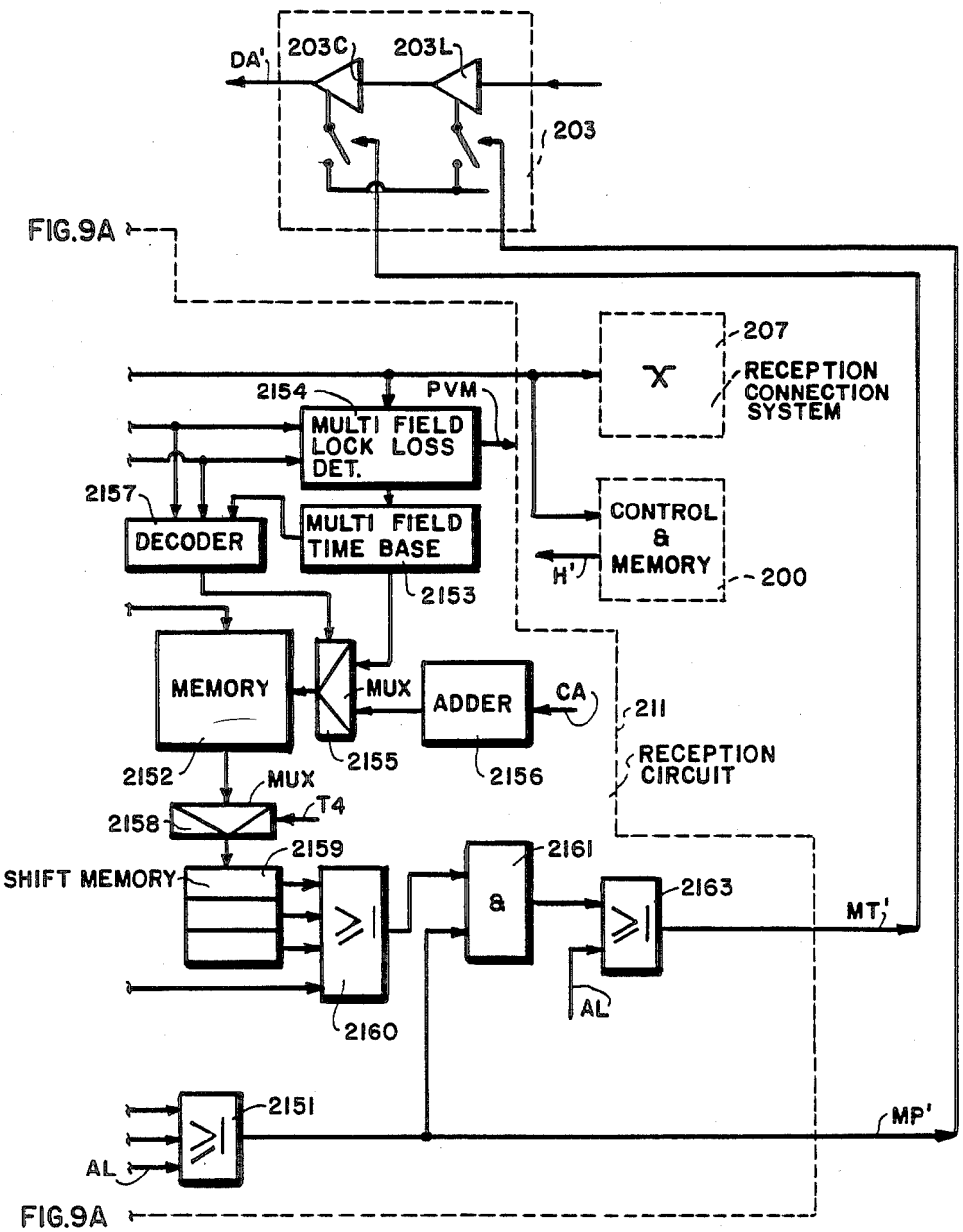

FIGS. 9A and 9B propose a diagram of reception circuit 211, identical to device 111. On reception, device 211 is very similar to device 110 on the transmission side, but the time base is no longer set up locally but is reconstituted from information existing in the incident multiplex. A field lock tracing system correctly positions the time base counters in relation to the lock words existing in the multiplex.

The elongated multiplex is reconverted into an elementary one with the aid of a memory 2130 which can contain two fields of the elongated multiplex. The information (marked DA' in the figure) contained in the incident multiplex and present at the output of reception circuit 203, and clock H' issued by control and memory device 200 and synchronous with the multiplex clock, are transmitted to the input of device 211 where they are converted by series-parallel converter 2131 before being written into memory 2130. The output information of the memory is then reconverted by a parallel-series converter 2132 for transmission to time reception connection system 207 and control and memory device 200.

In order to reconstitute the elementary multiplex comprising 32 channels V (as in a previous example), it is necessary to reconstitute a time base from the field lock information contained in channel M1 (second channel of the elongated multiplex). The first octet of channel M1 always consists of the field lock word. The loss and recovery criterion of the field lock may be selected, by way of example, from among the following rules:

loss criterion: lock is regarded as lost when the absence of at least one field lock word from among the four in channel M1 is detected three times in succession;
response criterion: lock is regarded as recovered when the alternate presence and absence of the field lock word has been detected four times.

Field lock detection device 2133, to the inputs of which information DA' and clock H' are also transmitted, is a conventional device which counts the number of absences of the lock word before deciding on the field lock loss, then supplying a field lock loss signal PVT. From then on, it seeks the reason for locking on all incoming bits. As soon as it finds a lock word it awaits the checking of its presence and absence four times before deciding to resume locking.

The time base is then reconstituted by means of a series of synchronous counters of clock H', with the output of frame lock detection device 2133 providing the information needed to reconstitute the time base at the input of the various counters. Counter 2134 advances at bit rate elementary channel counter 2135, which is an 8-counter giving the elementary channels in a channel of the elongated multiplex (addresses A0, A1, A2), channel counter 2136 which gives the addresses of the elongated multiplex channels (addresses A3, A4, A5, A6, A7) and finally memory selector 2137 which provides address wire A8 to indicate (according to the status of A8) the half of memory 2130 concerned. The information at counters 2135, 2136 and flip-flop 2137 is transmitted to multiplexer 2138 which provides the address information for memory 2130, thus ensuring the reconversion of the elongated into an elementary multiplex. The access time to memory 2130 at the channel rate V is divided into two: one for writing and one for reading. Command C' from multiplexer 2138 making it possible to provide addresses to the memory arises from a decoding circuit 2139 controlled by the signals from bit counter 2134 and channel counter 2135.

Writing into the memory is carried out in the half indicated by the status of A8 at the addresses dictated by commands A0, A1, A2, A3, A4, A5, A6 and A7.

Reading out of the memory is carried out in the half indicated by the status of $\overline{A8}$ at the addresses dictated by commands A5, A6, A7, A0, A1, A2, A3 and A4.

Writing into the memory thus takes place in the order 0, 1, 2, 3, 4, 5, 6, 7, 8, 9, ..., 253, 254, 255, whereas readout takes place in the order 0, 8, 16, 24, 32, ..., 248, 1, 9, 17, 25, ..., 247, 255.

The time base thus reconstituted makes it possible to extract the number of the last track used, which is in the odd-numbered octets of channel M1. In order to prevent transmission errors, two identical consecutive numbers must be received in order to be considered. This function is performed by means of two registers 2140 and 2141, in which the octets of the incoming multiplex are transferred at times A0$\overline{A1}$ of channel M1 (signal T1 transmitted to register 2140) and A0A1 from channel M1 (signal T2 transmitted to register 2141), which represent the octets of rank 4n +1 and 4n +3 of channel M1 with n=0 or 1. Signals T1 and T2 are obtained by decoder 2142 from counter 2135. If the contents of both registers 2140 and 2141 are equal, as discovered by comparator 2143, this content is transferred into a third register 2144 at time (signal T3 issued by counter 2135), validated by an AND gate 2145 which receives the output signal from comparator 2143 at one input and signal T3 at the other. The content of this third register corresponding to the number of the last channel used is systematically compared by comparator circuit 2146 to the status of a channel counter 2147 in order to control the partial switch-on of units 203L of reception circuit 203. Operation is then identical to that of device 110 described for the transmission side. A clock signal from elementary channel counter 2135, the frequency of which corresponds to that of the information concerning channels M of the elongated multiplex, is transmitted to one input of an AND gate 2148 and one of a flip-flop 2149. The output of comparator 2146 is applied on the one hand to the second input of AND gate 2148 after inversion and on the other to the second input of flip-flop 2149. The output signal of AND circuit 2148 thus makes it possible to advance channel counter 2147 at the clock signal rate, while the output signal of flip-flop 2149 is the control signal to switch reception circuit 203 partly on. Information from elongated multiplex channel counter 2135 is decoded by decoder 2150 which zeroes counter 2147 after detection of the last channel of the field and transmits a time generated by the time base to an input of OR circuit 2151. This time corresponds to the three channels preceding the start of the new field. The control signal for the partial switch-on of the reception circuit from flip-flop 2149 is sent to a second input of OR circuit 2151. Thus the signal at the output of OR circuit 2151 ensures partial switch-on MP' three channels before the start of the field.

Full switch-on is provided from 32×1 bit memory 2152 containing the occupation status of the channels which may be written in either by a microprocessor (which may be that of control unit 200) if the engagement of the channels is transmitted by semaphore channel or systematically from a multi-field time base 2153 reconstituted with the aid of the elementary multiplex (signal taken from the output of parallel-series converter 2132) and comprising multi-field counters. The output signal from parallel-series converter 2132 is applied to one input of a multi-field lock detection device 2154 with a configuration similar to that of device 2133. The information at counters 2135 and 2136 is also transmitted to device 2154. If a multi-field lock loss is detected, device 2154 supplies a multi-field lock loss signal PVM and seems the reason for locking in the same way as device 2133; if, however, lock is retained or restored by device 2154, the multi-field time base is reconstituted and the information passing through multiplexer 2155 is transmitted to memory 2152.

The access time to memory 2152 is divided into two: a time set aside read-out and one for write-in. This memory is actually organised into 16×2 bits since the state of occupation of two channels is found in channel V2 of the even-numbered fields. Writing into the memory is performed during channel V2 of the even fields at the addresses provided by multi-field counter 2153. The memory is read under the control of addresses CA (A3, A4, A5, A6, A7) at the output of counter 2136 of the elongated multiplex two channels ahead. Addresses CA in fact controlling the read-out of memory 2152 are supplied by adder circuit 2156 two stages in advance, while the output of circuit 2156 is connected to one input of multiplexer 2155. The command for the latter comes from a decoding circuit 2157 controlled by signals from multi-field time base 2153 and channel counters 2135 and 2136. The two outputs of the memory are connected to the inputs of a multiplexer 2158 controlled by signal T4 and time A3 from counter 2135 which makes it possible alternately to select one or other of the outputs. The output of multiplexer 2158 is connected to the input of a shift circuit 2159 and memorized three times in order to control the switch-on two channels ahead of the actually engaged channel. An OR circuit 2160 with three inputs connected to the three outputs of register 2159 represents the memory read-out plus the two previous read-outs. The fourth input of OR circuit 2160 receives a time from decoder circuit 2150. This time corresponds to the channel preceding the newfield (last channel of the field) and its three service channels M0, M1 and M2. The output of OR circuit 2160 is connected to the input of an AND circuit 2161 which controls the full switch-on (signal MT') of units 203C of reception circuit 203 when its second input sees active partial switch-on signal MP', this validating full switch-on.

Moreover, the information transmission system, which also comprises, included in the device for reconverting the multiplex and controlling the reception circuit, devices for detecting the field and multi-field lock respectively providing a frame lock loss and/or multi-frame lock loss signal in detection of such losses, is noteworthy in that it comprises in addition, included in the device for reconverting the multiplex and controlling the reception circuit, an alarm circuit supplying an alarm signal to dictate the full powering of the reception circuit after the detection of field and/or multi-field lock losses.

If, indeed, field or multi-field lock is lost, an alarm signal is supplied via an alarm OR circuit 2162 to the inputs of which are transmitted signals PVT of field lock loss and PVM multi-field lock loss, and the output of which supplies alarm signal AL. When it exists, the latter is sent to a third input of OR circuit 2151, causing units 203L to be switched on and to one of the two inputs of an OR circuit 2163 which, at its second input, receives the full switch-on signal, thus fully switching on units 203C of the reception circuit, while the time bases will not be completely blocked. These commands are necessary to give the station full access to the entire multiplex on stating or in the event of a shift and thus to reset its time bases. While, therefore, the time bases are not properly positioned and the various signallings cannot be correctly received, commands MP' and MT' are active.

If, instead of writing the channel occupation information into memory 2152 from the signallings in channel V2 on the even fields, the information is written by a microprocessor through dialogue via the semaphore channel—and this microprocessor may be that of control unit 200—the memory circuit is slightly altered. The memory is organised in 32×1 bits, with the information to be written in supplied viy data bus MPE' of the microprocessor, which may be data line BUSD' of the microprocessor of control unit 200. The write-in address in the memory comes from address bus MPA' of the microprocessor which may be address line BUSA' of control unit 200 and the read-in address is always signal CA (A3, A4, A5, A6, A7) present at the output of counter 2136 two channels ahead. There is no longer any need for multiplexer 2158 at the memory output.

Figure 10B:
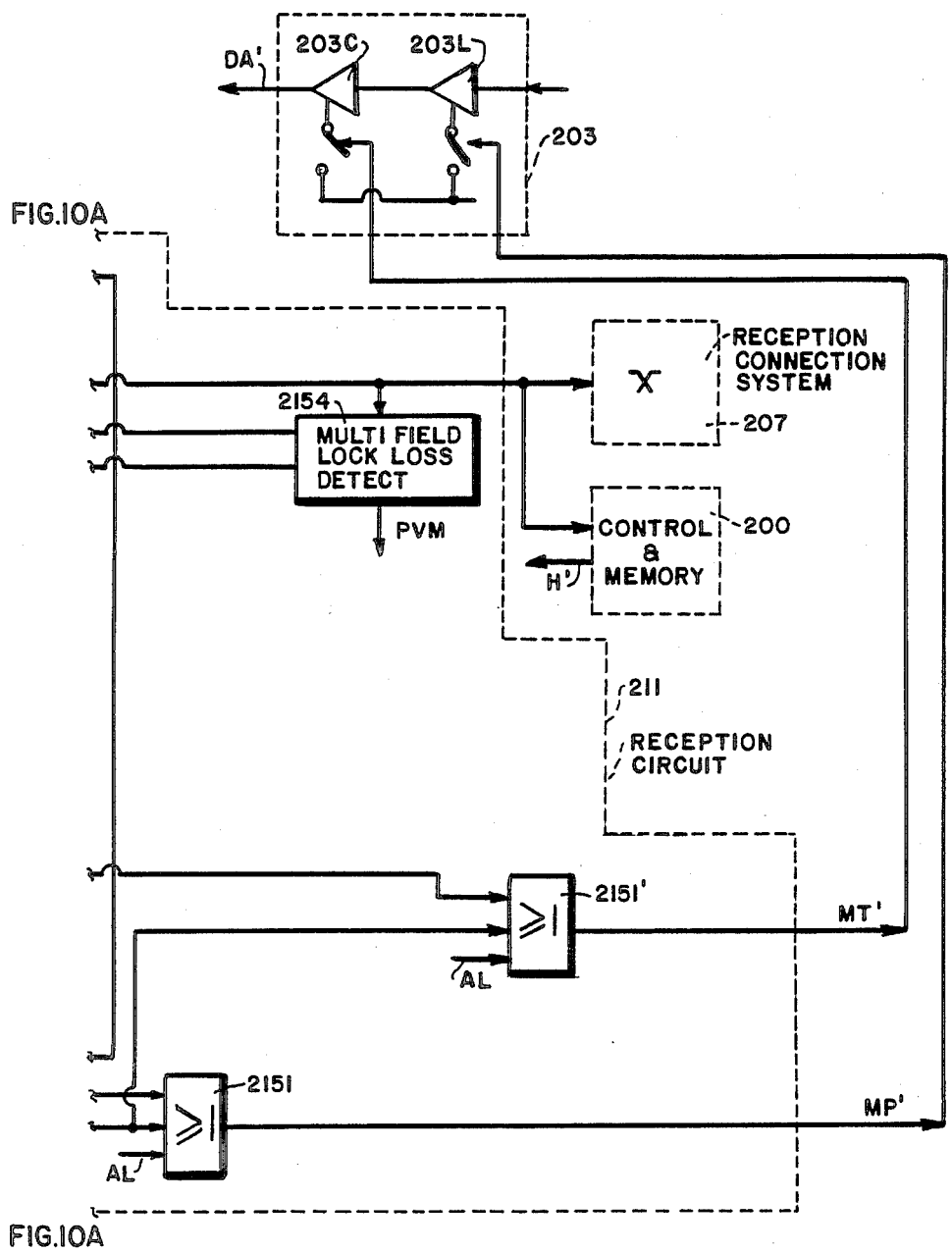

If desired, no use need be made of the individual channel occupation information; the commands of device 203 may be drawn up solely from the information on the number of the last channel used NDV. Here, partial switch-on is no longer controlled from the content of memory 2152 but from the information provided by the output of flip-flop 2149 (see FIG. 10A). This signal is connected to one input of an OR circuit 2151' and a time is dictated at a second input thereof. This time is supplied by decoding circuit 2150 from the signals from counter 2136. This time corresponds to the last channel M of the field. This OR circuit 2151' has a third input connected to the output of OR circuit 2162 supplying alarm signal AL in the event of the loss of the field and/or multi-field lock. The output of OR circuit 2151' supplies the full switch-on signal MT' which thus starts one channel ahead of the start of the field and lasts until the last channel used except in the event of an alarm, when it remains as long as the time bases have not been properly positioned. The device of FIG. 10 is identical to that of FIG. 9 as regards the drawing up of the partial switch-on signal and the reconversion of the multiplex. Only the drawing up of the full switch-on signal differs, and to this end circuits 2152, 2153, 2155, 2156, 2157, 2158, 2159, 2160, 2161, 2163 and control signals T4 and address signal CA are omitted or not used, while circuit 2151' is added.

Figure 11:
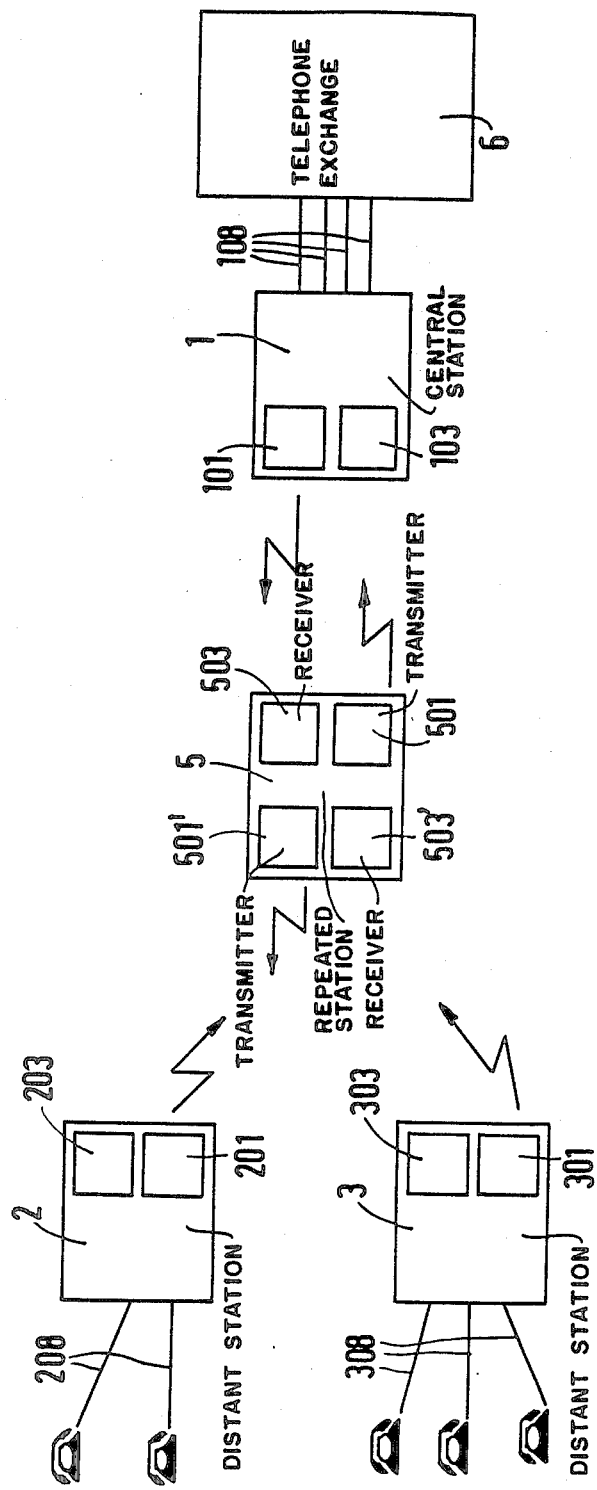
FIG. 11 shows a variant in the transmission system of the invention using more than two stations.

FIG. 11 shows a variant of the transmission system using more than two stations. The information is transmitted via Hertzian channels between central station 1 attached to telephone exchange 6 via telephone pairs 108 and a number of distant stations 2, 3, 4, 5, etc. The distant stations may be subscribers' terminals, e.g. 2, 3 and 4, connected to the subscribers via telephone pairs 208, 308 and 408 respectively, and may also be repeater stations like 5 to which subscribers may also be directly linked. The central, repeater and terminal stations are interconnected by radio, transmitting and receiving information via transmission and reception circuits. The central station is fitted with transmitting circuit 101 and reception circuit 103, terminal stations 2, 3 and 4 are fitted with transmission circuits 201, 301 and 401 and reception circuits 203, 303 and 403 respectively, and in particular repeater station 5 is fitted with a transmission circuit 501 and a reception circuit 503 to transmit and receive information to and from central station 1 and also has a transmitter circuit 501' and a reception circuit 503' to transmit and receive information to and from terminal stations 2, 3, 4, etc.

For a transmission system with more than two stations as described above, it is then preferable to use the TDMA (Time Distributed Multiple Access) principle for transmissions from the distant to the central stations so that all neighbouring stations like stations 2, 3 and 4 may transmit on a single radio frequency. The delays of the various stations are adjusted so that the information arrives properly staggered in time at the repeater station(s) (station 5) and at the central station 1. The information concerning one channel transmitted by a station is grouped in the form of a bunch with a waiting time, so that the various bunches do not overlap at a repeater or the central station. Such a procedure is described in the previously cited publication "COMMUTATION ET TRANSMISSION" No. 3, September 1981, under the title "Systèeme de té ephone rural IRT 1500". The previously described multiplex organisation is, of course, retained, for the direction from the central to the distant stations.

The information transmission system using the TDMA principle for the transmission direction from the distant to the central stations is noteworthy in that it uses means of allocating the information bunches side-by-side in the field. In the transmission direction, in fact, the principle of the concentration of the allocated bunches side-by-side at the start of the field is conserved in order to facilitate the commands for activating the transmission and reception circuits of the repeater station(s). The means used are similar to 110, 211 respectively described with reference to FIGS. 7, 8, 9 and 10 after the operation of the procedure described with reference to FIG. 6.

In fact, the information from a channel is issued in the form of a bunch which may, for example, have the following structure: several rhythm octets, one bunch start octet, one channel signalling octet and data octets concerning the channel involved. The bunches are seprarated by a delay in order to prevent any overalp on reception. There is a time base for the bunch field. For transmission, the position of this time base in relation to the time base reconstituted from the multiplex received is adjusted so that the bunches arrive with the proper spacing in the stations, e.g. 5 or 1.

On transmission, the partial and full switch-on control signals MP and MT are drawn up. Signal MP begins before the start of the field and continues to the end of the last bunch used. The number of the last bunch used is extracted from the multiplex received in the station. This signal MP is produced from a time supplied by the time base of the bunch field and from the signal showing equality between a time counter and the number of the last bunch used. Signal MT is supplied by a bunch occupation memory. This memory is read at the bunch transmission rate. The result of the read-out is memorised only once, as the start of the bunch transmitted contains rhythms information.

On reception, the partial switch-on command signals MP′ and MT′ are drawn up. Signal MP′ begins before the start of the field and lasts to the end of the last bunch used. It is also produced from a time provided by the time base of the bunch field and from the signal showing equality between a time counter and the number of the last bunch used. Signal MT′ is supplied by a bunch occupation memory. This memory is read at the bunch rate. The readout is performed before the arrival of a bunch (about 20 μsec) and then memorised at the start of the bunch. An OR circuit obtained from these two items of information thus gives a signal which begins 20 μs before the start of a bunch used and ends at the end of this bunch.

In accordance with the idea of the invention, transmission circuits 101, 501′ are preceded by a device for converting the multiplex and controlling the transmission circuit so that device 110 in station 1, reception circuits 203, 303, 403, and 503 are followed by a device for reconverting the multiplex and controlling the reception circuit so that device 211 of station 2, transmission circuits 201, 301, 401 and 501 are preceded by means similar to means 110, which, on the transmission side, have been described above, with reception circuits 103 and 503′ followed by means similar to means 211 which, on the reception side, have been described above.

What is claimed is:

1. A system for transmitting information between at least two stations in a time multiplex format comprising:
   means at one station for reformatting elementary fields which comprise a sequence of time multiplexed channels of a plurality of channels into an elongated field, said elongated field comprising the same channel from a plurality of n elementary fields; one of said channels including an indication of the last channel number in use;
   means for detecting at a second station which of said channels in said elongated field are engaged and which channels are not engaged, as well as the last channel number is use; and
   means for disabling certain power consuming transmission and reception circuits at said second station in response to the detection of an unused channel and the last channel number in use.

2. The invention as claimed in claim 1 wherein the elementary multiplex fields carry service and data channels.

3. The invention as claimed in claim 1 further comprising means for partly or fully cutting off and powering the transmission and reception circuits of said second station.

4. The invention as claimed in claim 3 wherein said elongated field carries service channels which carry a rhythm signal, field and multi-field lock words and a semaphore channel, and wherein the rhythm signal is transmitted at the very start of the multiplex elongated field.

5. The invention as claimed in claim 3 wherein the channel status information (free or engaged) and the number of the last channel used are transmitted in multiplex elongated field.

6. The invention as claimed in claim 5 wherein the transmission of the channel status information (free or engaged) and the number of the last channel used are used to control fully cutting off and powering the transmission and reception circuits.

7. The invention as claimed in claim 4 in which, when the channel status information transmission is used partly or fully to cut off and power the transmission and reception circuits, said elongated field is organized so the transmission of data channel occurs after several free channels and is immediately preceded by the transmission of a rhythm signal.

8. The invention as claimed in claim 6 wherein the transmission of the number of the last channel used alone is used to control partly or fully cutting off and powering the transmission and reception circuits.

9. The invention as claimed in claim 8 further comprising means for reconverting the multiplex elongated field to an elementary field and controlling the reception circuit, means for seeking the field lock and supplying a field and/or multi-field lock loss signal when field and/or multi-field lock losses are detected, and an alarm circuit for giving an alarm signal to dictate the full power control of the reception circuit after the detection of field an/or multi-field lock losses.

10. A system for transmitting information between at least two stations in a time multiplex format comprising:

a first station having a transmission circuit for placing data in an elementary time division multiplexed field having a plurality of channels, said channels including service channels as well as a larger number of data channels, at least tone of said service channels including lock words VT for recognizing said channels, and the last channel number being currently used;

means at said first station for reformatting said elementary time division field into an elongated field, said elongated field comprising a plurality of the same channels taking from a plurality of elementary fields, forming groups of the same channel from said plurality of elementary fields;

means at said station for detecting the last channel number being currently used an said lock words; and, means at said second station for disabling power consuming components of a transmission circuit and reception circuit of said second station when said last channel currently used is detected, and for synchronizing a time base at said second station with said lock words.

11. The system of claim 10 wherein said lock word and last channel number are sent in the same channel of alternate elongated fields.

12. The system of claim 10 further comprising means at said second station to reformat each received elongated data field into an elementary field.

13. The system of claim 10 further comprising means for identifying which channels of said elementary field are engaged and for grouping engaged channels in said elongated field.

* * * * *